(12) United States Patent
Srinivasan et al.

(10) Patent No.: US 11,634,573 B2
(45) Date of Patent: Apr. 25, 2023

(54) UV SHIELDING BIO-DERIVED FURANIC POLYMERS

(71) Applicant: COUNCIL OF SCIENTIFIC & INDUSTRIAL RESEARCH, New Delhi (IN)

(72) Inventors: Kannan Srinivasan, Bhavnagar (IN); Rajathsing Kalusulingam, Bhavnagar (IN); Gajula Sampath, Bhavnagar (IN); Koilraj Paulmanickam, Bhavnagar (IN); Duraikkannu Shanthana Lakshmi, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 341 days.

(21) Appl. No.: 16/960,839

(22) PCT Filed: Jan. 30, 2019

(86) PCT No.: PCT/IN2019/050069
§ 371 (c)(1),
(2) Date: Jul. 8, 2020

(87) PCT Pub. No.: WO2019/150386
PCT Pub. Date: Aug. 8, 2019

(65) Prior Publication Data
US 2020/0354558 A1   Nov. 12, 2020

(30) Foreign Application Priority Data
Feb. 1, 2018 (IN) .......................... IN201811003807

(51) Int. Cl.
C08L 29/04 (2006.01)
C08L 67/00 (2006.01)
C08J 5/18 (2006.01)

(52) U.S. Cl.
CPC .................. *C08L 29/04* (2013.01); *C08J 5/18* (2013.01); *C08L 67/00* (2013.01)

(58) Field of Classification Search
CPC ..................................................... C08L 29/04
See application file for complete search history.

(56) References Cited

U.S. PATENT DOCUMENTS

| 2008/0207795 A1 | 8/2008 | Henry et al. |
| 2008/0221236 A1 | 9/2008 | Clingerman et al. |
| 2017/0136747 A1* | 5/2017 | Torradas ............... B32B 29/002 |

FOREIGN PATENT DOCUMENTS

| CN | 104 250 415 A | 12/2014 |
| CN | 104 292 483 A | 1/2015 |
| KR | 101816590 B1 * | 1/2018 |

OTHER PUBLICATIONS

KR 101816590 B1 machine translation (Jan. 2018).*
International Search Report and Written Opinion. PCT/IN2019/050069, dated May 2, 2019.
Rasrendra, C.B. et al. 2013 "Experimental Studies on the Pyrolysis of Humins from the Acid-Catalysed Dehydration of C6-sugars" Journal of Analytical and Applied Pyrolysis 104: 299-307.
Couper, J.E.R. et al. eds 2011 in Renewable Polymers Synthesis, processing and technology, John Wiley & Sons, Inc., Hoboken, New Jersey, pp. 381-428.
Gandini, A. 2010 "Furans as offspring of sugars and polysaccharides and progenitors of a family of remarkable polymers: a review of recent progress" Polymer Chemistry 1: 245-251.
Pin, J-M. et al. 2014 "Valorization of biorefinery side-stream products: Combination of humins with polyfurfuryl alcohol for composite elaboration" ACS Sustainable Chem. Eng. 2: 2182-2190.
Hoang, T.M.C. et al. 2013 "Valorization of humin-based byproducts from biomass processing—A route to sustainable hydrogen" ChemSusChem 6:1651-1658.
Van Zandvoort, I. 2013 Formation, molecular structure, and morphology of humins in biomass conversion: Influence of feedstock and processing conditions: ChemSusChem 6: 1745-1758.
Van Zandvoort, I. 2015 "Full, Reactive solubilization of humin byproducts by alkaline treatment and characterization of the alkali-treated humins formed" ACS Sustainable Chemistry & Engineering 3 533-543.
Thakur, V.K. 2014 "Progress in Green Polymer Composites from Lignin for Multifunctional Applications: A Review", ACS Sustainable Chemistry & Engineering 2: 1072-1092.
Zeng, C. et al. 2013 "Bio-based furan polymers with self-healing ability" Macromolecules 5: 1794-1802.
Zeng. C. et al. 2013 "Self-healing bio-based furan polymers cross-linked with various bis-maleimides" Polymer 54: 5351-5357.
Qian. Y. et al., 2014 "Lignin: a nature-inspired sun blocker for broad-spectrum sunscreens" Green Chem. 17, 320-324.
Parejo, P.G. et al. 2006 "Highly efficient UV-absorbing thin-film coatings for protection of organic materials against photodegradation" J. Mater. Chem. 16: 2165-2169.
Zhu, H. et al. 2011 "Synthesis and UV Absorption Properties of Aurintricarboxylic Acid Intercalated ZnAl Layered Double Hydroxides" Ind. Eng. Chem. Res. 50: 13299-13303.
Hambardzumyan, A. et al. 2012 "Natural organic UV-absorbent coatings based on cellulose and lignin: designed effects on spectroscopic properties" Biomacromolecules 13: 4081-4088.
De Lima et al. 2012 "Transparent UV-absorbers thin films of zinc oxide:ceria system synthesized via sol-gel process" Optical Materials 35: 56-60.

(Continued)

*Primary Examiner* — Ana L. Woodward
(74) *Attorney, Agent, or Firm* — Knobbe, Martens, Olson & Bear, LLP

(57) ABSTRACT

UV shielding bio-derived furanic polymers (BFP) and UV-shielding composite films containing BFP having another polymer of natural or synthetic origin at varying concentration with high thermal stability, mechanical stability and elasticity are prepared through solvent evaporation casting. A process for preparing BFP having varying physicochemical properties can be carried out via dehydration of various biomass saccharides in different solvents employing various catalysts. The resulting brown-colored films show excellent UV shielding in the region 200 nm to 400 nm and exhibit high optical transparency. The UV shielding efficiency of the film increases with an increase in its treatment temperature. The films are stable and durable in terms of mechanical stability and elasticity even after exposing to harsh conditions without affecting their UV-shielding efficiency.

8 Claims, 4 Drawing Sheets

(56) References Cited

OTHER PUBLICATIONS

Shu, Y. et al. 2014 "Bioinspired nacre-like heparin/layered double hydroxide film with superior mechanical, fire-shielding, and UV-blocking properties" Ind. Eng. Chem. Res. 53: 3820-3826.

Shahabi-Ghahfarrokhi, I. 2014 "Preparation of UV-protective kefiran/nano-ZnO nanocomposites: physical and mechanical properties" Int J Biol Macromol 72: 41-46.

Wang, X. et al. 2014 "Fabrication of Fe3+ doped Mg/Al layered double hydroxides and their application in UV light-shielding coatings" J. Mater. Chem. C. 2: 5752-5758.

* cited by examiner

UV SHIELDING BIO-DERIVED FURANIC POLYMERS

FIELD OF INVENTION

This invention relates to providing bio-derived furanic polymers (BFP) with excellent UV shielding efficiency in the region 200-400 nm. The invention provides a process for the preparation of BFP via catalytic dehydration of biomass saccharides such as agarose chitosan, κ-carrageenan, cellulose, seaweed cellulose (Ulva), potassium alginate, starch, glucose, fructose, sucrose and xylose in various solvents using diverse catalytic systems followed by a post-processing methodology. Further, the invention provides preparation of thermally and mechanically durable optically transparent UV-shielding composite films using BFP and another polymer of natural or synthetic origin at low loading of BFP (0.5-2 wt. % with respect to other polymer).

BACKGROUND & PRIOR ART OF THE INVENTION

Humans are exposed to the Sun and other sources of ultraviolet (UV) radiation independent of their lifestyles and frequent exposure can lead lethal damage and chronic diseases. To avoid/combat the effect of UV radiation there are several options in practice (protection, prevention, and cure). UV absorbers are one among many protective routes that have been extensively used in textiles, hats, shades, awning, cream formulation (SPF lotions), window coatings etc. UV absorbers embedded organic coatings have also been used to control UV radiation damage in various substrates such as paints, plastics, wood & cosmetic formulations that remain unaltered despite severe exposure for a long duration.

Natural sources such as amino acids, castor oil, crude oil, flavonoids, green tea, papaya, rose and soybean oil can shield certain region of UV radiation; however upon long-term UV exposure mitigate their shielding efficiency. Lignin, a complex natural polymer of an aromatic alcohols (coumaryl, synapyl, coniferyl) fractional component of lignocellulosic biomass besides possessing thermal and mechanical properties exhibits UV shielding efficiency. Apart from the natural sources (in particular lignin), some of the inorganic materials such as cerium oxides, iron oxides, titanium oxides, and zinc oxides and synthetic organic chemicals, benzophenone and its derivative 2-hydroxy-4-methoxybenzophenone-5-sulfonic acid (HMBA) show high photostability and strong absorption in the UV range. Furfural is also reported to have the potential to shield UV radiation while its instability prevents utilization as a UV shielder. UV absorbers (natural, organic and inorganic materials) are explored through different routes to control the radiation effects in the form of paint formulation (nanoencapsulation), coating material (spin, spray, and LBL assembly), skin care lotion (emulsification) and thin film composites (solvent casting method). The sol-gel method is also used to prepare oxide-based UV absorbers. In general, UV shielding films based on metal oxides (for example $TiO_2$) are coated on glass plates to control UV light transmission for windows. The main disadvantage of such material is the lack of optical clarity and transparency in the visible region that retards UV shielding efficacy. It is well-known fact that UV radiation damages several materials such as plastics, rubber, and wood and, in general, and affect any kind of material by altering their mechanical, thermal and optical stability. Thus, it is necessary to have durable and stable UV shielders considering the commercial and civil society's needs. In order to solve world's energy-related issues (with an endeavor to partially substitute non-renewable fossil-based systems), "biomass" has its own potential for the production of organic chemicals, polymers and materials that are necessary in our daily life. While utilizing biomass in its value-addition chain, a huge amount of waste or by-product materials is often produced. Value addition of such waste is important at this juncture while developing a bio-refinery which is sustainable.

Furans are one of such value-added compounds that can be obtained from sugar-based biomass (cellulose and hemicellulose); while several research groups and companies are working, the process needs optimization to deploy on an industrial scale. Among many furan-based compounds, 5-hydroxymethylfurfural (HMF), one of the DoE (Department of Energy, U.S.) identified platform chemicals, has enormous potential in bio-based fuel and chemical sector. HMF can be obtained by dehydration of biomass saccharides. Currently, these processes are taking longer times and special care. While doing this process, it produces a furanic polymer (generally called 'humins') as side products (FIG. 1) wherein some of them are soluble and some are insoluble. In general, it is very difficult to separate the soluble from of humins from the reaction mixture. We believe that one does not require all the times the expensive neat polymers in pure form with restricted structure and limited properties. Sometimes extra functional groups, and mixed properties need to be added based on the requirements.

The polymers formed in such processes which were generally considered undesired or employed for low calorific applications, can be studied to explore their applications application potential similar to where furanic polymers are used. For e.g., furanic materials are used in binders preparation that can be used as furanic grouts, polymer cements and underwater applications which can replace the petroleum derived materials such as formaldehyde, urea formaldehyde resins, phenol, and epoxy materials as binder components (Furanic grout used in food service and/or medical service facilities, includes furfuryl alcohol that can be replaced with 5-hydroxymethyl furan or 2,5 furan dimethanol, and aromatic polyol, US patent 2008221236)(Binder composition, useful in e.g. foundry binder and sand mold, comprises phenolic-resole, phenolic or urea resin; furanic materials e.g. 5-hydroxymethyl furfural, 2,5-furan dimethylol or 2,5-furandicarboxylic acid; and/or crosslinker, US patent 2008207795). These polymers can also be useful in making special type carbon and carbon precursors with special properties (Experimental Studies on the Pyrolysis of Humins from the Acid-Catalysed Dehydration of C6-sugars, *Journal of Analytical and Applied Pyrolysis* (2013) 104, 299-307). HMF based polymers and their properties and applications are recently reviewed (5-Hydroxymethylfurfural Based Polymers, in: Renewable Polymers, John Wiley & Sons, Inc. 2011, pp. 381-428) (Furans as offspring of sugars and polysaccharides and progenitors of a family of remarkable polymers: a review of recent progress, *Polymer Chemistry* (2010) 1, 245-251). Furfuryl alcohol based polymers are also reported for various applications albeit having problems such as hydrophilicity etc.

The extent of polymers formation will be increased upon increasing the substrate concentration due to high contact of product with intermediates and substrate. Separation problem of these polymers is limiting the production of HMF in reality. Till now no efficient report is available on separation of these soluble polymers. Although HMF can be extracted from the reacted mixture, as the polymers are in the soluble form, the entire system cannot be reused after extraction of HMF which is difficult in reality due to a continuous increase in the level of polymers. There is also another problem commonly may occur that while extracting HMF using organic solvents, polymers may also be co-extracted along with HMF thereby affecting the purity. In surmise, formation of polymers in thermal/catalytic processing of sugars is very common. Without removing these polymers it will be difficult to proceed for subsequent reactions and difficult to obtain the products in pure form.

Humins are dark brown solid organic compound that have poor solubility in water and are much less explored due to the complexity in structure and lack of homogeneity. Very recently, these bio-derived furanic materials (humin-like compounds) are used in environmental remediation of heavy metal ions, resins, and thermosetting plastics. The insolubility and irregular structure of humins limits their use as just a fuel for heat generation. Different research groups tried to analyse their structure and properties, and found that solubility of them is major drawback. Many reports have appeared on physical properties of humins, and found their solubility in a solvent is the major problem. Although some attempts were made like alkaline treatment, the success is incremental. Having known that furfural exhibits UV shielding effect, similar furanic compounds or polymers such as humins that can be sourced from lignocellulosic biomass as waste or as by-product while forming targeted furan compounds can also be thoughtfully explored as a UV shielder.

Worldwide several research groups are working in developing an efficient conversion protocol for sugars to furan compounds. However, till date no process is reported on the processing of humin polymers, UV-shielding efficacy of humins that are co-produced while forming them. Some of the not-closely related art discuss the applicability of different bio-based materials as UV-shielders, processing of humin polymers, and use of humins in different applications are discussed below:

Reference is directed to paper by J. M. Pin and E. Jong titled "Valorization of biorefinery side-stream products: Combination of humins with polyfurfuryl alcohol for composite elaboration in *ACS Sustainable Chem. Eng.* (2014) 2, 2182-2190" discussed on thermosetting furanic composites. Large quantities of humins were included into a polyfuranic thermosetting network and compared with composites generated with polyfurfuryl alcohol (PFA) and with PFA/lignin. Humins were produced from fructose in alcohol medium and characterized. These black polymers contain certain amount of furan rings attached to intermediates of sugar dehydration. These polymers have both the furanic and polyalcohol properties.

Reference is directed to paper by T.M.C. Hoang and K. Seshan titled "Valorization of humin-based byproducts from biomass processing—A route to sustainable hydrogen in *ChemSusChem* (2013) 6, 1651-1658" that discussed catalytic steam reforming/gasification of humin with a view to provide a complete sustainable process for carbohydrate conversions in the bio-refinery concept. Alkali-metal-based catalysts are investigated, and the complexity of humin gasification is discussed.

Reference is directed to paper by I. V. Zandvoort and B. M. Weckhuysen titled "Formation, molecular structure, and morphology of humins in biomass conversion: Influence of feedstock and processing conditions in *ChemSusChem* (2013) 6, 1745-1758" that discussed formation and analysis of humin byproducts obtained during the acid-catalyzed dehydration of sugars. It concluded that the aliphatic linkages and oxygen functionalities of the network strongly depend on the feedstock and proposed a representative model for the molecular structure of humins. From the same group in another work titled "Full, Reactive solubilization of humin byproducts by alkaline treatment and characterization of the alkali-treated humins formed in *ACS Sustainable Chemistry & Engineering* (2015) 3, 533-543" discussed reactive dissolution of the humins via various spectroscopic techniques concluded the occurrence of changes in the molecular structure upon alkaline dissolution. Reference may be made to paper by V.K. Thakur and M.R. Kessler titled "Progress in Green Polymer Composites from Lignin for Multifunctional Applications: A Review, *ACS Sustainable Chemistry & Engineering* (2014) 2, 1072-1092". Lignin oil which is similar to furanic polymers was reported to be useful in many applications including blending in polymers giving a scope for applications of these polymers as well.

Reference is directed to paper by C Zeng and N. Yoshie titled "Bio-based furan polymers with self-healing ability in *Macromolecules* (2013) 5, 1794-1802" that discussed the preparation of a furan polymer, poly (2,5-furandimethylene succinate) by means of a condensation reaction between bio-based monomers. By controlling the amount of the bismaleimide, mechanical properties varied widely. These network polymers healed well when their broken surfaces were activated by bismaleimide solutions or solvent. The polymers also displayed excellent self-healing ability without external stimulus. From the same group in another work titled "Self-healing bio-based furan polymers cross-linked with various bis-maleimides. *Polymer* (2013) 54, 5351-5357" discussed mechanical and healing properties of the bio-based furan polymers wherein addition of bis-maleimides with phenylene rings markedly enhanced the tensile strength of the network.

Reference is directed to paper by J. Wang and Q. Yong titled "Lignin: a nature-inspired sun blocker for broad-spectrum sunscreens in *Green Chem.* (2015) 17, 320-324" investigated the performance of the alkali lignin recovered from the black liquid as sunscreen. Lignin was added to pure creams and commercial sun protection factor (SPF) 15 sun lotions as a broad-spectrum sunscreen active agent and compared protecting efficiency to those of SPF 30 and SPF 50 sunscreen products. Addition of lignin in creams improved the UV-blocking efficiency. However, the work is limited to UV protection in lotion and limitation in the UV-blocking efficiency (up to 400 nm).

Reference is directed to paper by David Levy and P.G Parejo titled "Highly efficient UV-absorbing thin-film coatings for protection of organic materials against photodegradation in *J. Mater. Chem.* (2006), 16, 2165-2169" that discussed high photostability and strong absorption in the UV range of a benzophenone derivative (2,2-dihydroxy, 4-methoxybenzophenone) when embedded in an ormosil matrix, that reduced photodegradation of the dye molecule upon irradiation with UV light. The usage of an organically modified silica matrix enhanced the solubility of the UV absorber in the matrix. The drawback of this work is the use of complex organically modified matrix, expensive UV-blocking organic derivative and limited thermal stability of the coated matrix.

Reference is directed to paper by X. Duan and H. Zhu titled "Synthesis and UV Absorption Properties of Aurintricarboxylic Acid Intercalated ZnAl Layered Double Hydroxides in *Ind. Eng. Chem. Res.* (2011), 50, 13299-13303" that reported the preparation of novel ordered organic/inorganic UV-absorbing material by the intercalation of trivalent ATA anions into the interlayer spacing of $ZnAl-NO_3$-LDHs, and, studied the thermal and UV light stability of the intercalated product. Further, the LDHs/PP composite film was prepared by the addition of the LDHs powder to PP resin, and the tolerance of this composite toward UV light was examined. After intercalation of ATP into interlayer of ZnAl-LDHs, excellent UV absorption ability was observed below 400 nm. The drawback of this work is complex preparation process that required specific equipment and higher energy.

Reference is directed to paper by V. A. Beghin and A Hambardzumyan titled "Natural organic UV-absorbent coatings based on cellulose and lignin: designed effects on spectroscopic properties in *Biomacromolecules* (2012) 13, 4081-4088" that discussed preparation of cellulose and lignin-based transparent coatings with controlled UV-absorbent properties. Cellulose/lignin nanocomposite films were first produced using lignin analogs (dehydrogenation polymers (DHPs)) and later with lignin oligomers isolated from spruce wood and corn stalks. One of the challenges when producing UV-absorbent coatings is to determine suitable manufacturing conditions, including the cellulose/lignin ratio that will ensure optimum optical properties (such as UV absorbance, transparency, and colorlessness) without chemical modification of the cellulose and lignin fractions. The drawback of this work is limited UV shielding up to 340 nm and use of hazardous solvent, dioxin, in the process.

Reference is directed to paper by J. F. Lima and O. A. Serra titled "Transparent UV-absorbers thin films of zinc oxide:ceria system synthesized via sol-gel process in *Biomacromolecules* (2012) 35, 56-60" that discussed transparent nanostructure $ZnO:CeO_2$ and ZnO thin films to use as solar protector that were prepared by non-alkoxide sol-gel process and deposited on borosilicate glass substrate by dip-coating technique followed by heating at 300-500° C. The drawback of this work is limited UV shielding up to 340 nm and use of hazardous solvent, dioxin, in the process.

Reference is directed to paper by Y. Shu and Lin Guo titled "Bioinspired nacre-like heparin/layered double hydroxide film with superior mechanical, fire-shielding, and UV-blocking properties in *Ind. Eng. Chem. Res.* (2014), 53, 3820-3826" that discussed the presence of large number of hydroxy groups on the surface of LDH nanoplatelets as well as in the HEP molecules, that facilitate the formation of a hydrogen bonded network at the organic-inorganic interface. Such bio-inspired, nacre-like HEP/LDH films showed combination of both UV-blocking and fire-resistance properties. The drawback of this work is limited UV shielding efficiency of HEP/LDH in the range of 300-360 nm.

Reference is directed to paper by I. S. Ghahfarrokhi and F. Khodaiyan titled "Preparation of UV-protective kefiran/ nano-ZnO nanocomposites: physical and mechanical properties in *Int J Biol Macromol.* (2014), 72, 41-46" that discussed production of a UV-protective kefiran bionanocomposite using ZnO and evaluated physical and mechanical properties. The drawback of this work is limited UV shielding efficiency of ZnO-kefiran. nanocomposites up to 363 nm.

Reference is directed to paper by X. Wang and L. Wu titled "Fabrication of $Fe^{3+}$ doped Mg/Al layered double hydroxides and their application in UV light-shielding coatings in J. Mater. Chem. C. (2014), 2, 5752-5758" that discussed doping $Fe^{3+}$ Mg/Al LDHs (Mg/Al+Fe-LDHs) through a simple solvothermal process as a new inorganic UV absorber. The as-obtained Mg/Al+Fe LDHs showed advantages namely: (i) absorption cover in the whole UV region, (ii) directly form transparent self-supporting inorganic films, (iii) they intrinsically possess excellent dispersion in the aqueous phase, (iv) can easily be embedded into waterborne or solvent-based polymeric coatings to produce highly transparent UV-shielding coatings, and (v) long-term durability. The drawbacks of this work are limited UV light blocking efficiency necessitating larger amount of $Fe^{3+}$ in Mg/Al LDHs, and use of hazardous flammable and toxic solvent, xylene, in the process.

Reference is directed to a patent titled "Preparation of alkali lignin/PVA light insulation blend membrane in Chinese Patent CN104292483 A (2015)" that discussed preparation of lignin/PVA blend films and evaluated physical, mechanical and light-shielding properties. The drawback of this work is limited optical transparency, higher loading, is limited mechanical properties and preparation of alkali lignin, spray treatment are required in the process.

Most prior-art mentioned above discusses preparation, structural and mechanical properties of humin polymer. However, the separation and modification of soluble humin polymers from the reaction mixture obtained from dehydration of various biomass saccharides (referred here as bioderived furanic polymer, BFP) in particular in organic medium were not reported. Though, UV shielding application is reported in the prior art with lignocellulosic polymer (such as lignin), but none of the prior-art teaches or suggests the use of BFP as UV shielding material. Further drawbacks of the reported UV shielding composite are: Not blocking the entire UV region (200-400 nm), the process for composite preparation involving specific equipment, higher energy and use of hazardous solvents such as dioxin and xylene. Further, the prepared composites did not provide/ reveal important properties such as optical transparency, thermal stability and mechanical stability.

ABBREVIATIONS

| | | | |
|---|---|---|---|
| BFP | Bio-derived furanic polymer (here from sugars) | DMF | Dimethylformamide |
| BFP-G | Glucose-derived furanic polymer | HMBA | 5-Benzoyl-4-hydroxy-2-methoxybenzenesulfonic acid |
| LCBFP | Light coloured bio-derived furanic polymer | LDH | Delaminated $Mg_2Al$-LDH |
| PVA | Polyvinyl alcohol | HMF | 5-hydroxymethylfurfural |
| PMMA | Polymethyl methacrylate | DFF | 2,5-diformylfuran |
| PVDF | Polyvinylidene difluoride | FDCA | 2,5-furandicarboxylic acid |
| PVC | Polyvinyl chloride | MeOH | Methanol |
| CMC | Carboxymethylcellulose | BMImCl | 1-butyl,3-methylimidazolium chloride |
| HMPC | Hydroxypropylmethylcellulose | HCl | Hydrochloric acid |
| KCA | κ-Carrageenan | DMTHF | 2,5-dimethyltetrahydrofuran |
| K-alg | Potassium alginate | BFP-W | Bio-derived furanic polymer (wet) |

| | | | |
|---|---|---|---|
| DMSO | Dimethyl sulfoxide | BFP-O | Bio-derived furanic polymer (Oven dried) |
| THF | Tetrahydrofuran | BFP-M | Bio-derived furanic polymer (MeOH washed) |
| NMP | N-Methyl-2-pyrrolidone | | |

OBJECTIVES OF THE INVENTION

The main objective of the present invention is to provide a UV shielding bio-derived furanic polymer (BFP).

Another objective is to prepare BFP-polymer composite film with excellent high UV-shielding efficiency and with high thermal stability, mechanical stability, optical transparency and elasticity.

Still another objective of the present invention is to use biomass saccharides as the source for bio-derived furanic polymer (BFP), as one of the polymers in the composite film.

Yet another objective of the present invention is to use either natural or synthetic polymer including organophilic polymers to be blended with BFP to make the composite film.

Still yet another objective of the present invention is to prepare the composite film through a simple synthesis protocol.

Another objective of the present invention is to prepare BFP using various biomass saccharides but not limited to such as glucose, fructose, sucrose, xylose, chitosan, κ-carrageenan (KCA), cellulose, seaweed cellulose (Ulva), starch, potassium alginate (K-alg), and agarose.

Another objective of the present invention is to develop a method to separate the dissolved BFP from the reaction mixture which are formed in the catalysed dehydration processes of biomass saccharides in organic medium, and to provide BFP-free HMF mixture in high purity that can be used for further processing.

Yet another objective of the present invention is to demonstrate the efficacy of the method developed for various kinds of sugars and by using different catalysts in various solvents. Yet another objective of the present invention is to assess and tune the physicochemical properties of BFP by varying raw materials, process conditions and the post-processing treatments such as drying method, and solvent treatment.

Still another objective of the present invention is to modulate the UV-shielding efficiency by varying the polymers, their loading, and treatment temperature.

Yet another objective of the present invention is to make the composite film thermally and mechanically stable with elasticity.

Still another objective of the present invention is to make the composite film with durability.

Still another objective of the present invention is to demonstrate the better UV-shielding efficiency of the composite film than the conventional polymer blends using lignin, furfural, benzopheneone, 5-benzoyl-4-hydroxy-2-methoxybenzenesulfonic acid (HMPA) or metal oxides.

Yet another objective of the present invention is to decolorize the dark brown coloured BFP for making better optically transparent composite film.

SUMMARY OF THE INVENTION

In the present invention, composite films containing bio-derived furanic polymer (at various wt. % ratios with respect to other polymer) and another polymer of natural or synthetic origin (several polymers including organophilic polymers) are prepared. The films were characterized for various physiochemical measurements to assess their durability and stability. The UV-shielding efficiency of these composite films was assessed by varying different process parameters. The durability of the films for this said property was also evaluated by treating these films under direct UV-irradiation for an extended time or sunlight exposure for several weeks to months. In addition, the UV-shielding efficiency of the composite films obtained in this invention was compared with other conventionally used UV-absorbers such as bio-derived materials and inorganic oxide materials.

In order to overcome the solubility of these bio-derived furanic polymers, various solvents were tested and the desired solubility was achieved by using solvents such as DMSO, DMF NMP or alkaline medium. Having known the structural changes associated upon alkaline dissolution and environmental unfriendliness associated with DMF, DMSO and NMP were chosen a solvent for casting the films.

In an embodiment of the present invention provides, UV shielding composite thin films having thickness in the range of but not limited to 0.06 to 0.08 mm comprising bio-derived furanic polymer (BFP) and synthetic or natural polymer with high thermal stability, mechanical stability, optical transparency and elasticity. Wherein BFP is obtained by a process via catalytic dehydration of biomass saccharide as substrate at various concentrations in the range 5-70% with respect to the solvent in solvents, not limited to, DMSO, or ionic liquid (BMImCl) and separated from the reaction mixture by a precipitation method using a precipitation solvent but not limited to water or MeOH, washed with water, MeOH or both and dried, but not limited to, in ambient condition at room temperature in the temperature range 24-28° C., in vacuum at 25° C. to 70° C., or in an air oven at temperature in the range of 80 to 105° C.

The present invention provides a UV shielding composite thin film having high thermal stability with $T_d$ value in the range of 273-335° C., mechanical strength in the range of 24.9-71.2 Mpa, optical transparency in the range of 82-97%, elasticity with strain value in the range of 176.9-338.5% and storage modulus in the range of 2808-29918 Mpa, UV shielding efficiency in the range of 200 to 481 nm, and thickness in the range of 0.06 to 0.08 mm comprising i) 0.5 to 2.0 wt. % of bio-derived furanic polymer (BFP); and ii) 99.5 to 98.0% of synthetic or natural polymer.

In an embodiment of the present invention the BFP is obtained by a process of comprising the steps of:
  a) catalytic dehydration of biomass saccharide in DMSO or ionic liquid (1-butyl,3-methylimidazolium chloride);
  b) separating the BFP from the reaction mixture obtained in step a) by precipitation using a precipitation solvent selected from the group consisting of water and MeOH;
  c) washing the precipitated BFP with water, MeOH or both; and
  d) drying BFP using set of conditions selected from: ambient condition at temperature in the range of 24-28° C., in vacuum at 25° C. to 70° C., at temperature in the range of 80 to 105° C.

In a preferred embodiment the biomass saccharide is selected from the group consisting of, agarose chitosan, κ-carrageenan, cellulose, seaweed cellulose (Ulva), potassium alginate, starch, glucose, fructose, sucrose and xylose and the catalyst is selected from the group consisting of AlCl3, CrCl3, CuCl2+alumina, ion-exchange resins such as Amberlyst-15 or Indion-190 and HCl.

In a preferred embodiment the synthetic polymer is selected from the group consisting of polyvinyl alcohol, polyvinyl chloride, polyvinylidene fluoride and polymethyl methacrylate.

In a preferred embodiment the natural polymer is selected from the group consisting of agar, agarose, carboxymethylcellulose, hydroxypropylmethylcellulose, κ-carrageenan and potassium alginate.

In another embodiment the UV-shielding efficiency of the composite thin film is in the range of 218 to 435 nm and the film retains UV-shielding efficiency on exposure to UV-radiation radiation for 90 min, sunlight for 30 days and treatment temperature in the range −20 to 210 C.

The present invention provides a process for preparing UV shielding composite thin film having high thermal stability, mechanical stability, optical transparency, elasticity and thickness in the range of 0.06 to 0.08 mm as claimed in claim 1 comprising the following steps:

i. obtaining BFP by a process of catalytic dehydration of biomass saccharide in DMSO, or ionic liquid (1-butyl, 3-methylimidazolium chloride); separating the BFP from the reaction mixture by precipitation using a precipitation solvent selected from the group consisting of, water and MeOH; washing the precipitated BFP with water, MeOH or both; and drying using ambient condition at temperature in the range of 24-28° C., or vacuum at 25° C. to 70° C., or at temperature in the range of 80 to 105° C.

ii. dissolving a synthetic or natural polymer and BFP prepared in step i) in a solvent at a temperature in the range of 60 to 120° C. under stirring in the range of 350-450 rpm to form a homogenous solution;

iii. drying the homogenous solution obtained in step ii) at a temperature in the range of 60 to 120° C. for 2 to 4 days to obtain a film; and iv. cooling the film to a temperature in the range of 24-28° C., and peeling out the composite film.

In a preferred embodiment the solvent used in step ii) is selected from the group consisting of dimethyl sulfoxide, n-methyl-2-pyrrolidone, dimethyl formamide and tetrahydrofuran.

The present invention further comprising modifying the colour of the film by decolorized BFP by treating with hydrogen peroxide, or by UV irradiation in THF (tetrahydrofuran).

In one preferred embodiment of the present invention, the thermal stability, mechanical stability and elasticity vary in the range 273 to 335° C., 45 to 71 Mpa and 232-335% respectively.

DETAILED DESCRIPTION OF THE INVENTION

The present invention discloses a UV shielding bio-derived furanic polymer (BFP) having excellent UV shielding efficiency (defined here as shielding of >99.5% of the UV light up to a given wavelength, i.e., measured at 0.5% transmittance), demonstrating processing, application, and efficiency.

Figure 1:
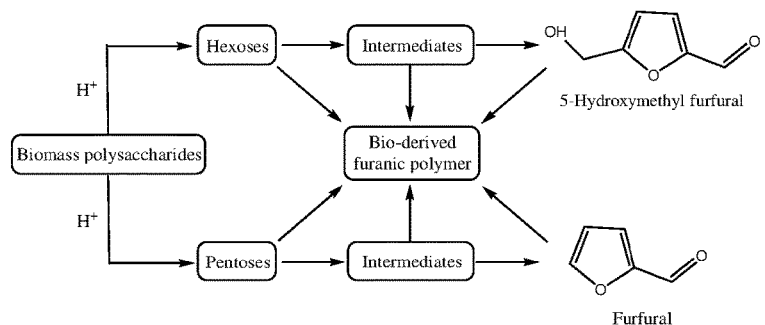
FIG. 1 Illustrates the routes for the formation of BFP in the process of furans production from sugars FIG. 2 UV-vis transmittance spectra of (a) BFP-G (5 mg to 8 g/L) in DMSO, (b) BFP-G, lignin, furfural (1 g/L) in DMSO.
Figure 2A:
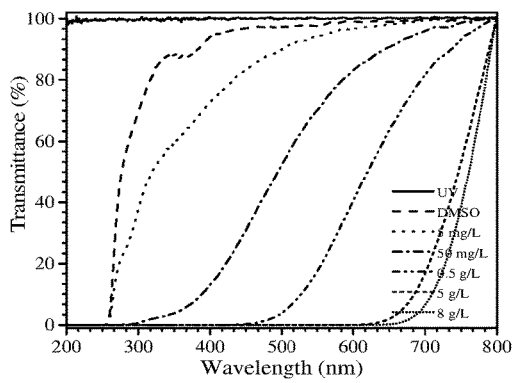
Figure 2B:
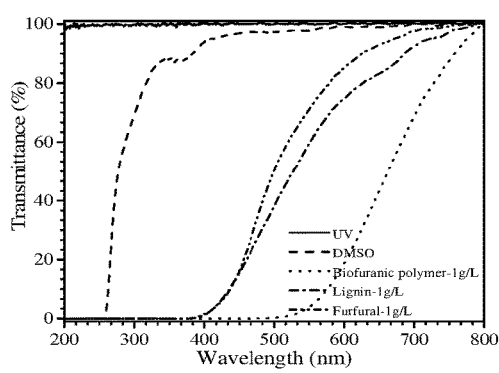

In present invention, the UV shielding efficiency of BFP was checked by dissolving BFP in solvent with varying concentration of BFP (FIG. 2).

Figure 3:
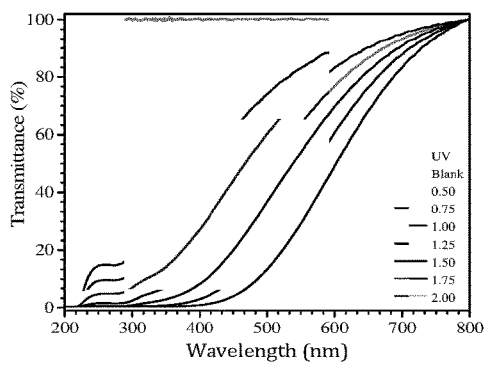
FIG. 3 UV-vis transmittance spectra of PVA/BFP-G composite films.

The present invention also provides a process for the preparation of PVA/BFP-G composite thin films by solvent evaporation method having a various concentration of BFP-G. The UV shielding efficiency of the composite film varied with varying concentration of BFP loading (225-401 nm) and an optimum value showed maximum UV shielding efficiency (FIG. 3).

The BFP based composites thin films used in this invention were characterized by using various analytical techniques in particular by using UV-vis absorbance spectroscopy (UV-vis), thermogravimetric analysis (TGA), differential scanning calorimetry (DSC), universal testing machine (UTM), and dynamic mechanical analysis (DMA).

Figure 11:
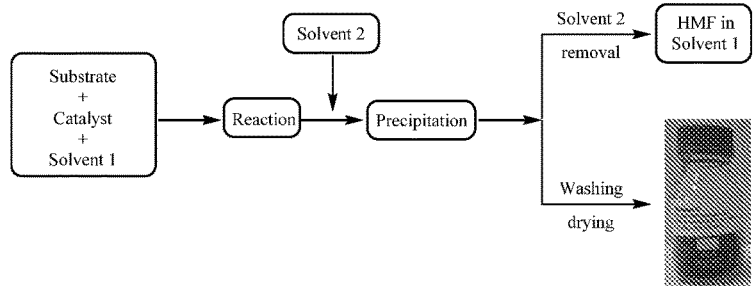
FIG. 11 Illustrates the pictorial flow diagram of process for the separation of BFP from reaction mixture FIG. 12 Illustrates the pictorial flow diagram of process for the decolorisation of BFP.

Referring now to the invention in more detail to FIG. 11, for the processing of BFP, the product mixture was made by contacting the substrate with a catalyst in organic solvent under thermal condition. With or without catalyst, the product mixture is taken and aqueous medium was added to it to precipitate the BFP. After separation of BFP, water may be removed to get the HMF mixture which may be used for other applications or reused for BFP precipitation.

The method of processing BFP is in following three steps:

Step 1 demonstrates the preparation of BFP from various substrates at different concentrations in various solvents over various catalysts Step 2 demonstrates the precipitation of BFP. Normally, BFP are soluble in many organic solvents, and thus are difficult to get them precipitated. In this field of invention, we discovered, that water and methanol as suitable solvents for precipitation in which the polymers are insoluble. Further, to remove the absorbed sugars or other products formed in the reaction from the precipitated BFP, washing with solvent is necessary. This invention demonstrates the method of separation of soluble BFP using the solvents as precipitating agents at different ratios.

Step 3 demonstrates the drying method for BFP. After step 2, where separated BFP are washed with different solvents and dried by different methods at different temperatures to vary the properties of BFP (includes vacuum drying, oven drying, and evaluating the changes in the properties of the BFP). By simple vacuum drying, we obtained original BFP which are soluble again in reaction solvent if added. By drying at high temperatures to remove the absorbed water from wet BFP, they lose their solubility in solvents that would be detrimental for commercial applicability. To overcome this problem, we washed precipitated wet polymer with methanol initially to remove adhered water, after which BFP could be easily dried under ambient conditions without the necessity of heating and with retention of their high solubility. In other words, the choice of solvent and sequence of washing is critical in ascertaining the quality of the end product.

By drying at higher temperatures, we get compact (thermosetting) BFP which are insoluble or sparingly soluble in reaction solvent.

From the miscibility assessment of DMSO, HMF, water and furanic polymers with different solvents, the following solvents are chosen (from the solubility chart) and experimentally validated as suitable for different requirements

TABLE

List of solvents suitable for the requirements

| Requirement | Suitable solvents |
| --- | --- |
| For separation of [DMSO + water + HMF] and [BFP] | Water, MeOH |
| For removal of [DMSO] from [BFP] | Water, MeOH, Dichloromethane, Ethylacetate, Toluene |
| For the removal of [water] from [BFP] | MeOH |

Solubility of BFP was checked by adding certain amount of BFP in 0.5 ml of solvent taken in a 1.5 ml centrifuge tube. After vigorous shaking, the mixture was centrifuged at 8500 rpm for 10 min, then supernatant was removed and the solid remained was dried in vacuum for 1 day at room temperature (R. T., 25° C.) and weighed. Then it was dried in oven at 90° C. for 12 h and then weighed. The solubility was calculated based on amount of solid remained.

| | Solubility of polymer (g/100 g solvent) | |
| --- | --- | --- |
| Solvent | Wet polymer, calculated on dry polymer basis | Polymer dried in oven (90° C. for 1 day) |
| Water | Nil | Nil |
| Dimethylsulphoxide | 6.0 | 0.3 |
| Dimethylformamide | 5.2 | 0.3 |
| Acetone | 6.1 | Nil |
| Acetonitrile | 4.3 | Nil |
| Hexane | 0.2 | Nil |
| Tetrahydrofuran | 9.8 | 0.02 |
| 2-Propanol | 2.5 | Nil |

-continued

| | Solubility of polymer (g/100 g solvent) | |
| --- | --- | --- |
| Solvent | Wet polymer, calculated on dry polymer basis | Polymer dried in oven (90° C. for 1 day) |
| Aniline | 4.0 | 0.05 |
| 0.1M NaOH | 3.0 | 1 |
| 0.1M $H_2SO_4$ | Nil | Nil |
| 1M $NH_4OH$ | 1.9 | 0.3 |
| Trimethylamine(30% in water) | 6 | 3 |

[a]It is approximate amount observed by eyes after cenrtifugation.

[a]It is approximate amount observed by eyes after centrifugation.

In one of the studies, PVA and BFP of appropriate amounts were taken in 25 ml DMSO in a 100 ml round-bottomed (RB) flask at room temperature. The homogeneous solution was heated at 90° C. and stirred at 400 rpm for 30 min. The solution was transferred into a petri dish (950×12 mm) and dried in an air oven at 90° C. for 3 days (for DMSO removal) and cooled to room temperature. Thin films were peeled out and analyzed for UV shielding efficiency. Neat PVA film was also prepared using the same protocol without adding BFP. In the absence of BFP (neat PVA), thin film shows UV shielding efficiency up to 190-220 nm while the composite films showed UV shielding up to 401 nm. The values reported here are at 0.5% transmittance level. In addition optical transmittance of the film were assessed and are reported here as percentage as at 700 nm.

The BFP based composites thin films used in this invention were characterized by using various analytical techniques in particular by using UV-vis absorbance spectroscopy (UV-vis), thermogravimetric analysis (TGA), differential scanning calorimetry (DSC), universal testing machine (UTM), and dynamic mechanical analysis (DMA).

Figure 4A:
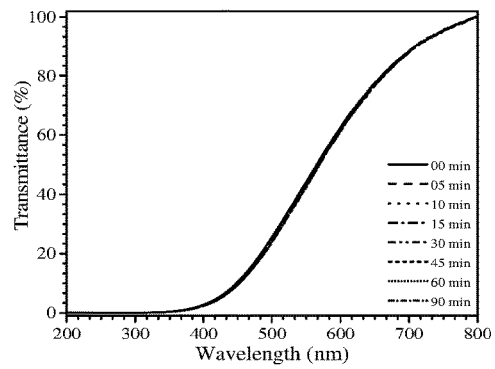
FIG. 4 UV-vis transmittance spectra of PVA/BFP-G composite film (a) Effect of UV irradiation, (b) Effect of sunlight and (c) Effect of temperature.

The durability studies were investigated for PVA/BFP-G composites thin film under (a) UV irradiation for 90 min (b) sunlight exposure for 30 days and (c) thermal treatment in the range of −20 to 210° C. for 90 min. The UV shielding efficiency was 375 nm for (a), and (b) and 375-490 nm for (c) depending on the treatment temperature (FIG. 4a, b & c).

Figure 5A:
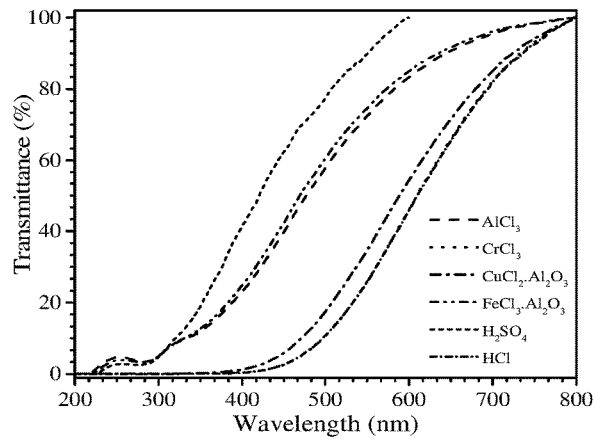
FIG. 5 UV-vis transmittance spectra of PVA/BFP composite film a) prepared using different catalysts b) prepared from different sugar sources using HCl as a catalyst.

The UV shielding efficiency PVA/BFP-G composite thin films was compared with BFP obtained using different catalysts such as $AlCl_3$, $CrCl_3$, $CuCl_2/Al_2O_3$, $FeCl_3/Al_2O_3$, $H_2SO_4$ and HCl using glucose as the sugar source. Among them, $CrCl_3$ catalyst derived PVA/BFP-G composite film showed (FIG. 5a) better shielding efficiency (406 nm) than other catalysts $AlCl_3$ (225 nm), $CuCl_2/Al_2O_3$ (401 nm), $FeCl_3/Al_2O_3$ (221 nm) water-$H_2SO_4$ system (229 nm) and HCl system (398 nm).

Figure 5B:
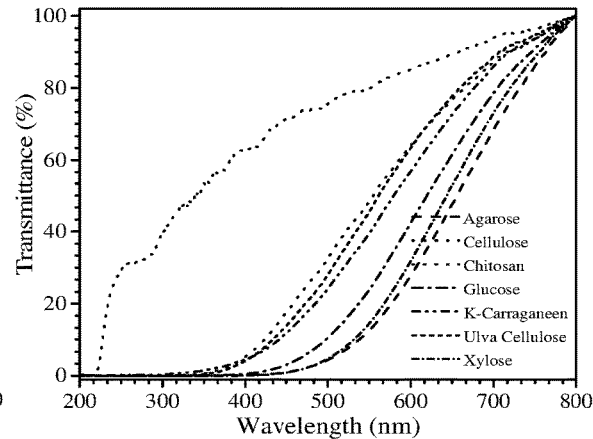

The UV shielding efficiency of PVA/BFP composite thin films was compared with BFP derived from various sugar sources such as agrose chitosan, κ-carrageenan, cellulose, seaweed cellulose (Ulva), potassium alginate, starch, glucose, fructose, sucrose, and xylose using HCl as a catalyst.These films were also prepared by adopting similar process conditions. Among the sources, xylose derived PVA/BFP composite film showed (FIG. 5b) better shielding efficiency (435 nm) than other sources agrose (431 nm), chitosan (220 nm), κ-carrageenan (309 nm), cellulose (345 nm), seaweed cellulose (Ulva) (349 nm), potassium alginate (220 nm), starch (390 nm), glucose (398 nm), fructose (424 nm), and sucrose (410 nm).

Figure 6A:
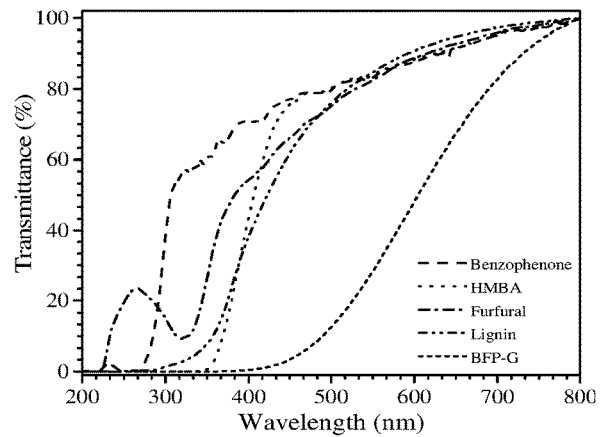
FIG. 6 UV-vis transmittance spectra of PVA composite films using a) BFP-G, lignin, benzopheneone, HMBA and furfural b) metal oxides.

The UV shielding efficiency of PVA/BFP-G was compared with conventional UV shielding material such as lignin furfural, benzophenone and 5-bezoyl-4-hydroxy-2-methoxy-benzenesulfonic acid (HMBA) as PVA/lignin, PVA/furfural, PVA/benzophenone and PVA/HMBA composite thin films. These films were prepared by the similar process adopted earlier. PVA/BFP-G composite film showed (FIG. 6a) better shielding efficiency (401 nm) than PVA/lignin (288 nm) PVA/furfural (225 nm), PVA/benzophenone (267 nm) and PVA/HMBA (349 nm).

Figure 6B:
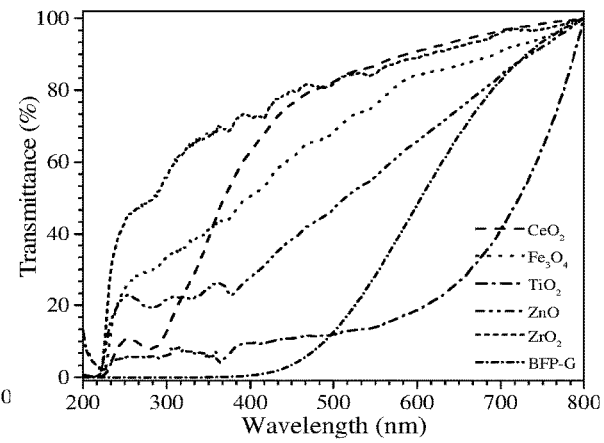

The UV shielding efficiency of PVA/BFP-G was also compared with PVA/metal oxides ($CeO_2$, $Fe_3O_4$, $TiO_2$, ZnO and $ZrO_2$) composites thin film. These films were prepared by the similar process. PVA/BFP-G composite film showed (FIG. 6b) better shielding efficiency (401 nm) than conventional metal oxide composites—PVA/$CeO_2$ (226 nm), PVA/$Fe_3O_4$ (225 nm), PVA/$TiO_2$ (425 nm at 10% transmittance level), PVA/ZnO (218 nm), and PVA/$ZrO_2$ (220 nm).

Figure 7A:
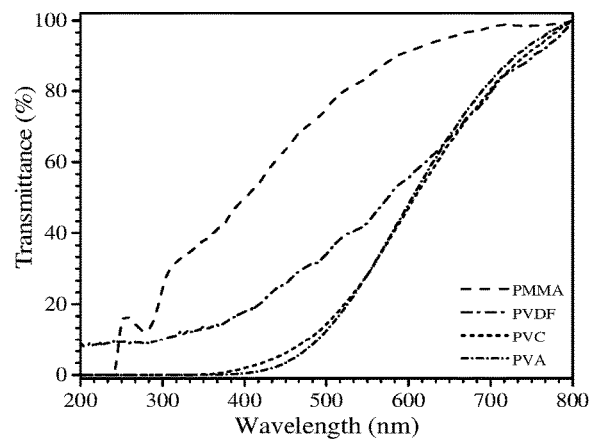
FIG. 7 UV-vis transmittance comparison spectra of BFP-G film a) organophilic composite b) hydrophilic biopolymers composites. c) CMC (3.75, 7.5 g), LDH (75 mg) loaded.

The UV shielding efficiency of organophilic/BFP-G composites thin films was tested using various hydrophobic polymers such as PVC, PVDF, and PMMA. These films were prepared by the similar process as adopted for PVA. Among them, PVA/BFP-G composite film showed (FIG. 7a) better shielding efficiency (401 nm) than other polymers—PVC/BFP-G (370 nm), PVDF (300 nm at 10% transference level), and PMMA (240 nm).

Figure 7B:
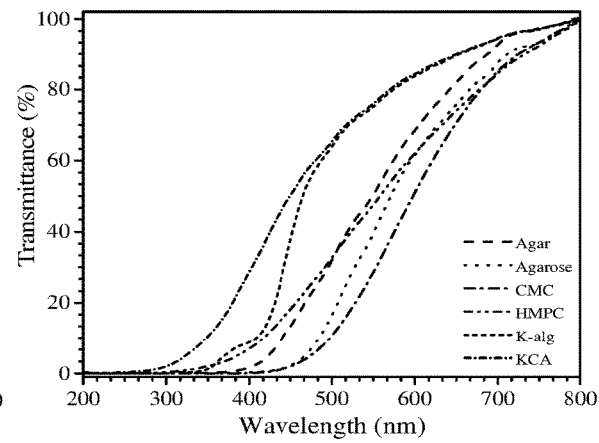

The UV shielding efficiency of bio-polymers/BFP-G composites thin films was tested using different hydrophilic bio-based polymers such as KCA, K-alg, HMPC, CMC, agarose, and agar. These films were prepared by the similar process, however, using water as a solvent and by adjusting the pH to 8 using 0.1 M $NaHCO_3$. Among them, CMC/BFP-G composite film showed (FIG. 7b) better shielding efficiency (425 nm) than other polymers—HMPC (312 nm), agarose (419 nm), agar (379 nm), K-alg (335 nm) and KCA (266 nm).

Figure 7C:
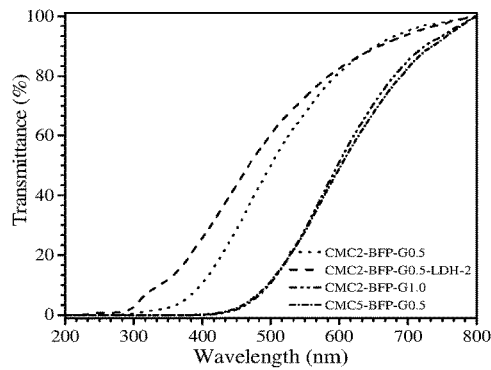

The UV shielding efficiency of bio-polymers/BFP-G composites thin films was tested by using various concentrations of CMC and BFP-G. These films were prepared by the similar process, however, using water as a solvent and by adjusting the pH to 8 using 0.1 M $NaHCO_3$ or solid base MgAl-LDH. Among them, CMC2-BFP-G1.0 and CMC5-BFP-G0.5 composite film showed (FIG. 7c) better shielding efficiency (425 nm) than CMC2-BFP-G0.5 (300 nm), CMC2-BFP-G0.5-LDH-2 (239 nm).

Figure 8A:
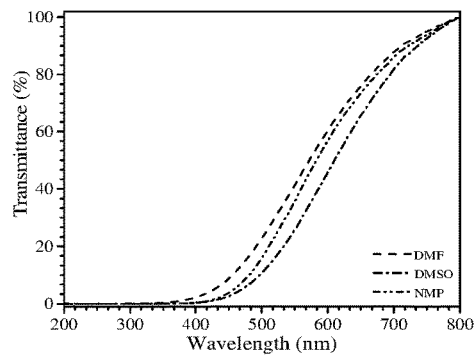
FIG. 8 UV-vis transmittance spectra of PVA/BFP composite film a) composite films prepared in different solvents b) mixing at different temperature c) evaporation at different temperature d) prepared on one meter scale.

The UV shielding efficiency of PVA/BFP-G composite thin films prepared using different solvent medium namely DMSO, DMF and NMP was assessed. PVA/BFP-G composite film using DMSO system showed (FIG. 8a) better shielding efficiency (409 nm) than other solvents DMF (356 nm) and NMP (404 nm).

Figure 8B:
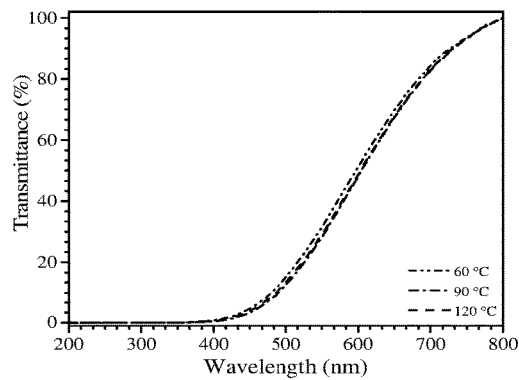

The UV shielding efficiency of PVA/BFP-G composite solution is mixed at various temperatures (60, 90 and 120° C.). PVA/BFP-G composite film preparation using mixing temperature at 90° C. system showed (FIG. 8b) better shielding efficiency (409 nm) than others temperature at 60° C. (386 nm) and 120° C. (393 nm).

Figure 8C:
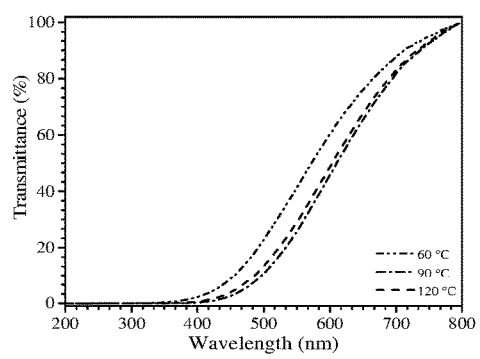

The UV shielding efficiency of PVA/BFP-G composite thin films are evaporated at various temperatures (60, 90 and 120° C.). PVA/BFP-G composite film preparation using evaporation temperature at 90° C. system showed (FIG. 8c) better shielding efficiency (409 nm) than others temperature at 60° C. (356 nm) and 120° C. (389 nm).

Figure 8D:
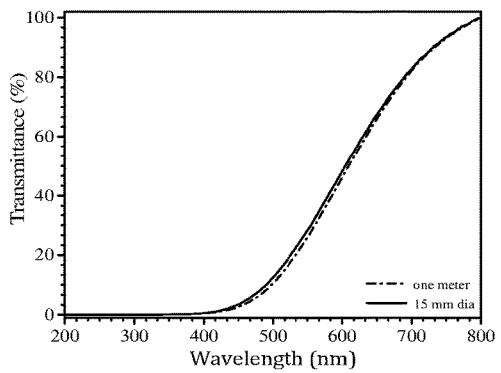

The UV shielding efficiency of PVA/BFP-G (15 mm dia) is compared with one meter scale composite thin film. PVA/BFP-G composite film prepared at one meter scale showed (FIG. 8d) similar shielding efficiency (406 nm) as that of 15 mm dia scale (401 nm).

Figure 9A:
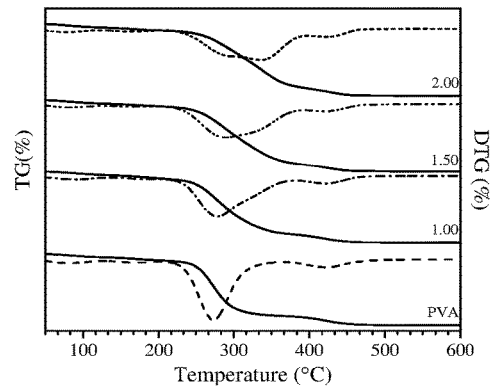
FIG. 9 Thermal stability of PVA/BFP-G composite films a) TGA b) DSC.
Figure 9B:
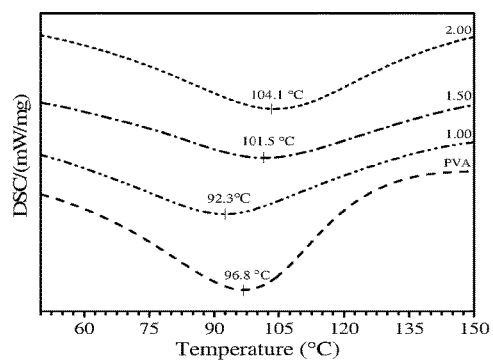
Figure 10A:
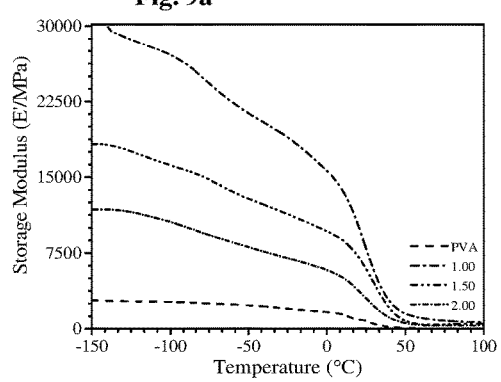
FIG. 10 Mechanical stability of PVA/BFP-G composite films a) UTM b) DMA.
Figure 10B:
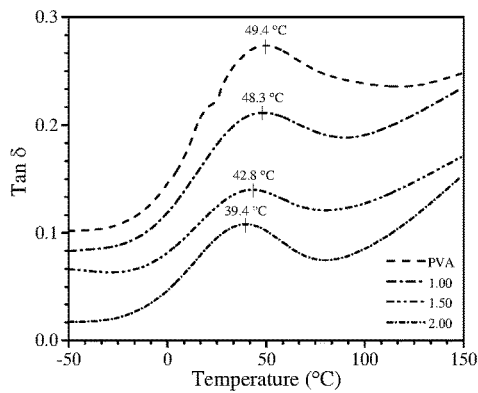
Figure 10C:
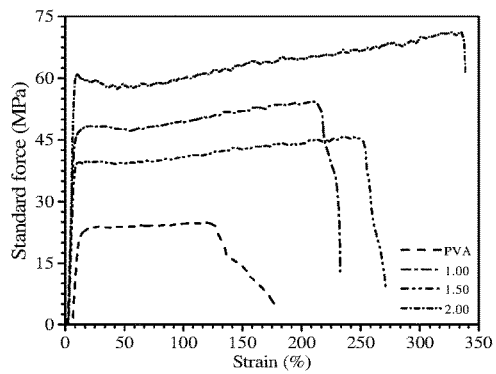

Thermal stability of PVA/BFP-G composite thin films prepared by solvent evaporation method showed a decomposition temperature ($T_d$) deduced from TGA is in the range 273 -335° C. while the glass transition temperature ($T_g$) deduced from DSC is in the range 92-104° C. depending on the loading of BFP-G in the film (FIG. 9a & b). Mechanical stability and elasticity for PVA/BFP-G composite thin films showed (FIGS. 10a & b) 29918-11807 Mpa as deduced from DMA-storage modulus with tan δ ($T_g$–49–39.4° C.) and strength in the range 45-71 Mpa with a strain in the range 232-335% through UTM measurements (FIG. 10c).

Figure 12:
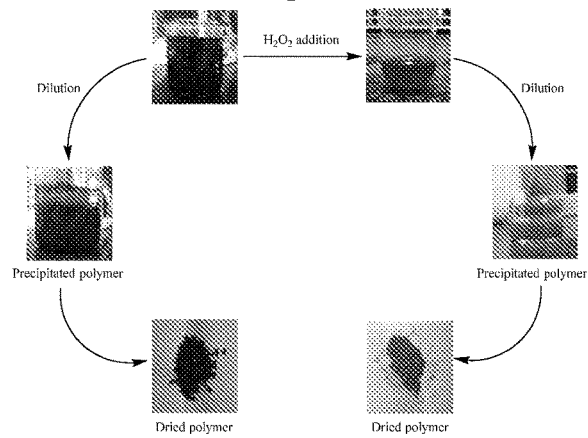
Figure 13:
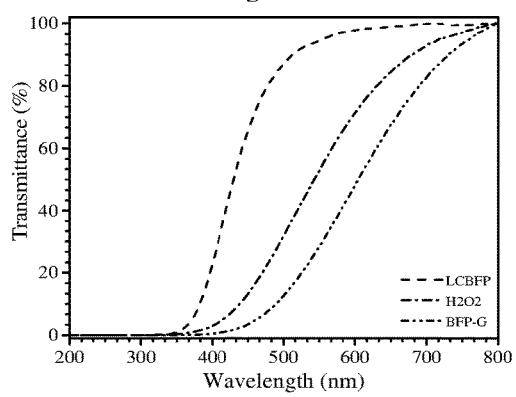
FIG. 13 UV-vis transmittance spectra of decolorized BFP composite film compared with BFP-G.

Decolorisation of BFP:

The color of BFP obtained (dark brown) may limit their applications. Thus, a pre-treatment process was employed (FIG. 12) to decolorize from dark brown to whitish/creamish by chemical oxidation treatment. The UV shielding efficiency of PVA/BFP-G was compared with light coloured bio-derived furanic polymer. Synthesis of light colored BFP-G was obtained by (i) adding $H_2O_2$ during the synthesis of BFP-G (ii) by UV-irradiation of synthesized BFP-G in THF and correspondingly named as PVA/BFP-G-$H_2O_2$ and PVA/LCBFP composite thin films. These films were prepared by the similar process adopted earlier. PVA/BFP-G composite film showed (FIG. 13) better shielding efficiency (401 nm) than PVA/BFP-G-$H_2O_2$ (358 nm) and PVA/LCBFP (343 nm).

EXAMPLES

Example: 1a Assessment of UV Shielding Properties at Minimum Loading of BFP-G in DMSO (5 mg/l)

For preparation of BFF-G, 0.9 g of glucose and 0.1 mmol HCl (1 N aqueous) catalyst were added to 3 g DMSO which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.112 g. Then BFP-G was dissolved in DMSO at a concentration 5 mg/l at 25° C. The homogenous BFP solution was tested for UV shielding efficiency analyzed in the range of 200-800 nm by UV-vis absorption spectroscopy given in FIG. 2a. The UV shielding was observed up to 258 nm at 0.5% transmittance level and optical transparency was 99.2% at 700 nm.

Example: 1b Assessment of UV Shielding Properties at Maximum Loading of BFP-G in DMSO (8 g/l)

BFP-G was prepared as in Example: 1a. BFP-G was dissolved in DMSO at a concentration 8 g/l at 25° C. The homogenous BFP solution was tested for UV shielding efficiency analyzed in the range of 200-800 nm by UV-vis absorption spectroscopy given in FIG. 2a. The UV shielding was observed up to 661 nm at 0.5% transmittance level and optical transparency was 6.3% at 700 nm.

Example: 1c Assessment of UV Shielding Properties of Lignin in DMSO (1 g/l) for Comparison Lignin (Sigma-Aldrich) was dissolved in DMSO at a concentration 1 g/l at 25° C. The homogenous lignin solution was tested for UV shielding efficiency analyzed in the range of 200-800 nm by UV-vis absorption spectroscopy given in FIG. 2b. The UV shielding was observed up to 390 nm at 0.5% transmittance level and optical transparency was 68.6% at 700 nm.

Example: 1d Assessment of UV Shielding Properties of Furfural in DMSO (1 g/l) for Comparison Furfural (Sigma-Aldrich) was dissolved in DMSO at a concentration 1 g/l at 25° C. The homogenous furfural solution was tested for UV shielding efficiency analyzed in the range of 200-800 nm by UV-vis absorption spectroscopy given in FIG. 2b. The UV shielding was observed up to 388 nm at 0.5% transmittance level and optical transparency was 97.6% at 700 nm.

Example: 1e Assessment of UV Shielding Properties of BFP-G in DMSO (1 g/l)

BFP-G was prepared as in Example: 1a. BFP-G was dissolved in DMSO at a concentration 1 g/l at 25° C. The homogenous BFP solution was tested for UV shielding efficiency analyzed in the range of 200-800 nm by UV-vis absorption spectroscopy given in FIG. 2b. The UV shielding was observed up to 511 nm at 0.5% transmittance level and optical transparency was 68.6% at 700 nm.

Example: 2 UV Shielding Performance of PVA/BFP-G composite at minimum loading of BFP-G (0.5 wt %)

500 mg of PVA (Molecular weight=1,30,000, Sigma-Aldrich) was taken in 25 ml of DMSO in a 100 ml round-bottomed (RB) flask at 27° C. To that 2.5 mg of BFP-G prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 3. The UV shielding was observed up to 225 nm at 0.5% transmittance level and optical transparency was 96.6% at 700 nm.

Example: 3 UV Shielding Performance of PVA/BFP-G Composite at Maximum Loading of BFP-G (2.0 wt %)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 3. The UV shielding was observed up to 401 nm at 0.5% transmittance level and optical transparency was 82.6% at 700 nm. BFP composite film was thermally stable up to 335° C. whereas neat PVA composite shows 273° C. ($T_d$ value increased by 62° C.). Mechanical strength of BFP composite film was 71 Mpa whereas neat PVA composite shows 25 Mpa (an increase by 46 Mpa). Strain of BFP composite film was 334% whereas PVA shows 176% (Strain value increased by 158%). Storage modulus of BFP composite film was 29918 Mpa whereas PVA shows 2808 Mpa (Storage modulus increased by 27110 Mpa).

Example: 4 Durability of PVA/BFP-G Composite for UV Shielding Performance Under UV Irradiation for 5 min 500 mg of PVA (Molecular weight=1,30,000, Sigma-Aldrich) was taken in 25 ml of DMSO in a 100 ml round-bottomed (RB) flask at 27° C. To that 7.5 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and UV irradiated at 25° C. for 5 min and analyzed by UV-vis absorption spectroscopy given in FIG. 4a. The UV shielding was observed up to 353 nm at 0.5% transmittance level and optical transparency was 88.4% at 700 nm.

Example: 5 Durability of PVA/BFP-G Composite for UV Shielding Performance Under UV Irradiation for 90 min 500 mg of PVA (Molecular weight=1,30,000, Sigma-Aldrich) was taken in 25 ml of DMSO in a 100 ml round-bottomed (RB) flask at 27° C. To that 7.5 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and UV irradiated at 25° C. for 90 min and analyzed by UV-vis absorption spectroscopy given in FIG. 4a. The UV shielding was observed up to 359 nm at 0.5% transmittance level and optical transparency was 88.3% at 700 nm.

Figure 4B:
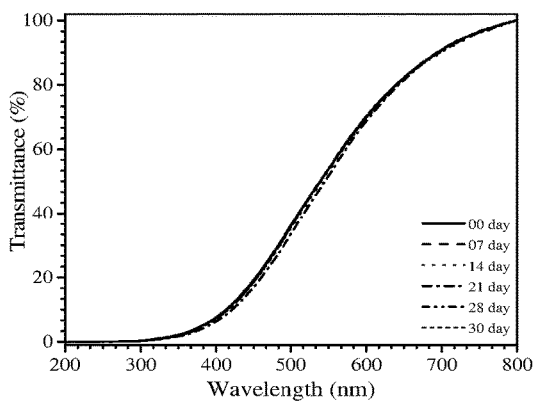

Example: 6 Durability of PVA/BFP-G Composite for UV Shielding Performance Under Sunlight Exposure for 1 Day 500 mg of PVA (Molecular weight=1,30,000, Sigma-Aldrich) was taken in 25 ml of DMSO in a 100 ml round-bottomed (RB) flask at 27° C. To that 7.5 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and sunlight exposed to at 30° C. for 1 day and analyzed by UV-vis absorption spectroscopy given in FIG. 4b. The UV shielding was observed up to 310 nm at 0.5% transmittance level and optical transparency was 90.7% at 700 nm.

Example: 7 Durability of PVA/BFP-G Composite for UV Shielding Performance Under Sunlight Exposure for 30 Days 500 mg of PVA (Molecular weight=1,30,000, Sigma-Aldrich) was taken in 25 ml of DMSO in a 100 ml round-bottomed (RB) flask at 27° C. To that 7.5 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and sunlight exposed to at 30° C. for 30 days and analyzed by UV-vis absorption spectroscopy given in FIG. 4b. The UV shielding was observed up to 316 nm at 0.5% transmittance level and optical transparency was 90.4% at 700 nm.

Example: 8 Durability of PVA/BFP-G Composite for UV Shielding Performance Under Thermal Treated at −20° C.

Figure 4C:
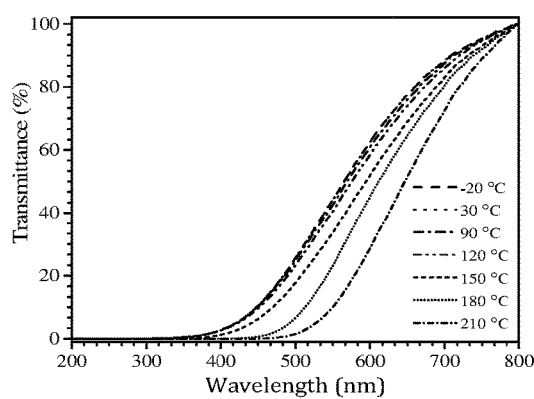

500 mg of PVA (Molecular weight=1,30,000, Sigma-Aldrich) was taken in 25 ml of DMSO in a 100 ml round-bottomed (RB) flask at 27° C. To that 7.5 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and thermal treated at -20° C. for 90 min and analyzed by UV-vis absorption spectroscopy given in FIG. 4c. The UV shielding was observed up to 350 nm at 0.5% transmittance level and optical transparency was 88.4% at 700 nm.

Example: 9 Durability of PVA/BFP-G Composite for UV Shielding Performance Under Thermal Treated at 210° C.

500 mg of PVA (Molecular weight=1,30,000, Sigma-Aldrich) was taken in 25 ml of DMSO in a 100 ml round-bottomed (RB) flask at 27° C. To that 7.5 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and thermal treated at 210° C. for 90 min and analyzed by UV-vis absorption spectroscopy given in FIG. 4c. The UV shielding was observed up to 481 nm at 0.5% transmittance level and optical transparency was 72.5% at 700 nm.

Example: 10 UV Shielding Performance of PVA/BFP-G Composite, (BFP-G Derived from Glucose, $CuCl_2/Al_2O_3$ as a Catalyst)

5 g of glucose, 0.3 mmol $CuCl_2.6H_2O$ and 1 g $Al_2O_3$ were added to 10 g DMSO which was preheated to 140° C., and then stirred at 800 rpm for 4 h. Then this mixture was cooled to room temperature (25° C.), centrifuged to remove catalyst, and added to 20 g water to precipitate BFP. BFP was separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.674 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-G (derived from glucose, $CuCl_2+Al_2O_3$ as catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5a. The UV shielding was observed up to 401 nm at 0.5% transmittance level and optical transparency was 82.7% at 700 nm.

Example: 11 UV Shielding Performance of PVA/BFP-G Composite, (BFP-G Derived from Glucose, $AlCl_3$ as a Catalyst)

5 g of glucose and 0.3 mmol $AlCl_3.6H_2O$ catalyst were added to 10 g DMSO which was preheated to 120° C., and then stirred at 800 rpm for 8 h. Then this mixture was cooled to room temperature (25° C.) and added to 20 g water to precipitate BFP. BFP was separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.812 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-G (derived from glucose, $AlCl_3$ as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5a. The UV shielding was observed up to 225 nm at 0.5% transmittance level and optical transparency was 95.4% at 700 nm.f Example: 12 UV Shielding Performance of PVA/BFP-G Composite, (BFP-G Derived from Glucose, $CrCl_3$ as a Catalyst)

5 g of glucose, and 0.3 mmol $CrCl_3.6H_2O$ were added to 10 g DMSO which was preheated to 120° C., and then stirred at 800 rpm for 8 h. Then this mixture was cooled to room temperature (25° C.) and added to 20 g water to precipitate BFP. BFP was separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.336 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-G (derived from glucose, $CrCl_3$ as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5a. The UV shielding was observed up to 406 nm at 0.5% transmittance level and optical transparency was 85.1% at 700 nm.

Example: 13 UV Shielding Performance of PVA/BFP-G Composite, (BFP-G Derived from Glucose, $FeCl_3/Al_2O_3$ as a Catalyst)

5 g of glucose, 0.3 mmol $FeCl_3$ and 1 g $Al_2O_3$ were added to 10 g DMSO which was preheated to 140° C., and then stirred at 800 rpm for 4 h. Then this mixture was cooled to room temperature (25° C.), centrifuged to remove catalyst, and added to 20 g water to precipitate BFP. BFP was separated by centrifugation, and washed 2 times each with 20 g of water, and 1 time with 20 g MeOH and then dried in vacuum at room temperature (25° C.) for 6 h and in air oven for 12 hat 105° C. The amount of BFP obtained is 1.11 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-G (derived from glucose, $FeCl_3+Al_2O_3$ as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5a. The UV shielding was observed up to 221 nm at 0.5% transmittance level and optical transparency was 96.3% at 700 nm.

Example: 14 UV Shielding Performance of PVA/BFP-G composite, (BFP-G Derived from Glucose, Water-$H_2SO_4$ as a Catalyst)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (derived from glucose, water-$H_2SO_4$ as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 5a. The UV shielding was observed up to 229 nm at 0.5% transmittance level and optical transparency was 99.9% at 700 nm.

Example: 15 UV Shielding Performance of PVA/BFP-G composite, (BFP-G Derived from Glucose, HCl as a Catalyst)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5a & b. The UV shielding was observed up to 398 nm at 0.5% transmittance level and optical transparency was 81.8% at 700 nm.

Example: 16 UV Shielding Performance of PVA/BFP Composite, (BFP Derived from Agarose, HCl as a Catalyst)

0.3 g of agarose and 0.1 mmol HCl (1N aqueous) catalyst were added to 3 g DMSO which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.053 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-agarose (derived from agarose, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 431 nm at 0.5% transmittance level and optical transparency was 68.2% at 700 nm.

Example: 17 UV Shielding Performance of PVA/BFP Composite, (BFP Derived from Chitosan, HCl as a Catalyst)

0.3 g of chitosan and 0.1 mmol HCl catalyst (1 N aqueous) were added to 3 g BMImCl solvent which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. 500 mg of PVA (Molecular weight=1,30,000, Sigma-Aldrich) was taken in 25 ml of DMSO in a 100 ml round-bottomed (RB) flask at 27° C. To that 10.0 mg of BFP-chitosan (derived from chitosan, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 220 nm at 0.5% transmittance level and optical transparency was 94.2% at 700 nm.

Example: 18 UV Shielding Performance of PVA/BFP composite, (BFP Derived from KCA, HCl as a Catalyst)

0.3 g of κ-carrageenan and 0.1 mmol HCl catalyst (1N aqueous) were added to 3 g BMImCl solvent which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. 500 mg of PVA (Molecular weight=1,30,000, Sigma-Aldrich) was taken in 25 ml of DMSO in a 100 ml round-bottomed (RB) flask at 27° C. To that 10.0 mg of BFP-KCA (derived from κ-carrageenan, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 309 nm at 0.5% transmittance level and optical transparency was 86.1% at 700 nm.

Example: 19 UV Shielding Performance of PVA/BFP Composite, (BFP Derived from Cellulose, HCl as a Catalyst)

0.3 g of cellulose and 0.1 mmol HCl catalyst (1N aqueous) were added to 3 g BMImCl solvent which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.120 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-cellulose (derived from cellulose, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 345 nm at 0.5% transmittance level and optical transparency was 87.4% at 700 nm.

Example: 20 UV Shielding Performance of PVA/BFP Composite, (BFP Derived from Sea Weed Ulva Cellulose, HCl as a Catalyst)

0.3 g of Ulva cellulose and 0.1 mmol HCl catalyst (1N aqueous) were added to 3 g BMImCl solvent which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. 500 mg of PVA (Molecular weight=1,30,000, Sigma-Aldrich) was taken in 25 ml of DMSO in a 100 ml round-bottomed (RB) flask at 27° C. To that 10.0 mg of BFP-ulva (derived from sea weed Ulva cellulose, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 349 nm at 0.5% transmittance level and optical transparency was 88.9% at 700 nm.

Example: 21 UV Shielding Performance of PVA/BFP Composite, (BFP Derived from K-alg, HCl as a Catalyst)

0.3 g of potassium alginate and 0.1 mmol HCl catalyst (1N aqueous) were added to 3 g BMImCl solvent which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. 500 mg of PVA (Molecular weight=1,30,000, Sigma-Aldrich) was taken in 25 ml of DMSO in a 100 ml round-bottomed (RB) flask at 27° C. To that 10.0 mg of BFP-K-alg (derived from potassium alginate, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 220 nm at 0.5% transmittance level and optical transparency was 94.3% at 700 nm.

Example: 22 UV Shielding Performance of PVA/BFP Composite, (BFP Derived from Starch, HCl as a Catalyst) 0.9 g of starch and 0.1 mmol HCl (1N aqueous) catalyst were added to 3 g DMSO which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.107 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-starch (derived from starch, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 390 nm at 0.5% transmittance level and optical transparency was 76.9% at 700 nm.

Example: 23 UV Shielding Performance of PVA/BFP Composite, (BFP Derived from Fructose, HCl as a Catalyst)

0.9 g of fructose and 0.1 mmol HCl (1N aqueous) catalyst were added to 3 g DMSO which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.072 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-fructose (derived from fructose, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 424 nm at 0.5% transmittance level and optical transparency was 80.5% at 700 nm.

Example: 24 UV Shielding Performance of PVA/BFP composite, (BFP Derived from Sucrose, HCl as a Catalyst)

0.9 g of sucrose and 0.1 mmol HCl (1N aqueous) catalyst were added to 3 g DMSO which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.102 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-sucrose (derived from sucrose, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 410 nm at 0.5% transmittance level and optical transparency was 80.9% at 700 nm.

Example: 25 UV Shielding Performance of PVA/BFP Composite, (BFP Derived from Xylose, HCl as a Catalyst)

0.9 g of xylose and 0.1 mmol HCl (1N aqueous) catalyst were added to 3 g DMSO which was preheated to 120° C., and then stirred at 800 rpm for 4 h. Then this mixture was cooled to room temperature (25° C.) and added to 6 g water to precipitate BFP. BFP was separated by centrifugation, and washed 2 times each with 6 g of water, and 2 times with 6 g MeOH and then dried in vacuum at 25° C. for 6 h and in air oven for 12 h at 105° C. The amount of BFP obtained is 0.094 g. 500 mg of PVA (Molecular weight=1,30,000, Sigma-Aldrich) was taken in 25 ml of DMSO in a 100 ml round-bottomed (RB) flask at 27° C. To that 10.0 mg of BFP-xylose (derived from xylose, HCl as a catalyst) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 5b. The UV shielding was observed up to 435 nm at 0.5% transmittance level and optical transparency was 72.9% at 700 nm.

Example: 26 UV Shielding Performance of PVA/Lignin Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of lignin was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 6a. The UV shielding was observed up to 288 nm at 0.5% transmittance level and optical transparency was 97.2% at 700 nm.

Example: 27 UV Shielding Performance of PVA/Furfural Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of furfural was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.06 mm) was peeled out and analyzed by UV-vis absorption spectroscopy given in FIG. 6a. The UV shielding was observed up to 225 nm at 0.5% transmittance level and optical transparency was 95.8% at 700 nm.

Example: 28 UV Shielding Performance of PVA/Benzopheneone Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of benzopheneone was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.06 mm) was peeled out and analyzed by UV-vis absorption spectroscopy given in FIG. 6a. The UV shielding was observed up to 267 nm at 0.5% transmittance level and optical transparency was 95.2% at 700 nm.

Example: 29 UV Shielding Performance of PVA/HMBA Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of HIVIBA was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 6a. The UV shielding was observed up to 349 nm at 0.5% transmittance level and optical transparency was 95.2% at 700 nm.

Example: 30 UV Shielding Performance of PVA/$CeO_2$ Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of $CeO_2$ was added. The flask was heated and stirred at 90° C. for 30 min. at 400 rpm and ultrasonication at 30° C. for 30 min. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 6b. The UV shielding was observed up to 226 nm at 0.5% transmittance level and optical transparency was 96.5% at 700 nm.

Example: 31 UV Shielding Performance of PVA/$Fe_3O_4$ Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of $Fe_3O_4$ was added. The flask was heated and stirred at 90° C. for 30 min. at 400 rpm and ultrasonication at 30° C. for 30 min. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 6b. The UV shielding was observed up to 225 nm at 0.5% transmittance level and optical transparency was 90.7% at 700 nm.

Example: 32 UV Shielding Performance of PVA/$TiO_2$ Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of $TiO_2$ was added. The flask was heated and stirred at 90° C. for 30 min. at 400 rpm and ultrasonication at 30° C. for 30 min. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 6b. The UV shielding was observed up to 425 nm at 10% transference level and optical transparency was 40.8% at 700 nm.

Example: 33 UV Shielding Performance of PVA/ZnO Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of ZnO was added. The flask was heated and stirred at 90° C. for 30 min. at 400 rpm and ultrasonication at 30° C. for 30 min. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 6b. The UV shielding was observed up to 218 nm at 0.5% transmittance level and optical transparency was 83.9% at 700 nm.

Example: 34 UV Shielding Performance of PVA/$ZrO_2$ Composite for Comparison 500 mg of PVA (Molecular weight=1,30,000, Sigma-Aldrich) was taken in 25 ml of DMSO in a 100 ml round-bottomed (RB) flask at 27° C. To that 10.0 mg of $ZrO_2$ was added. The flask was heated and stirred at 90° C. for 30 min. at 400 rpm and ultrasonication at 30° C. for 30 min. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 6b. The UV shielding was observed up to 220 nm at 0.5% transmittance level and optical transparency was 96.5% at 700 nm.

Example: 35 UV Shielding Performance of PVC/BFP-G Composite 500 mg of PVC was taken in 25 ml of DMSO in a 100 ml round-bottomed (RB) flask at 27° C. To that 10.0 mg of BFP-G was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 7a. The UV shielding was observed up to 370 nm at 0.5% transmittance level and optical transparency was 80.3% at 700 nm.

Example: 36 UV Shielding Performance of PVDF/BFP-G Composite 500 mg of PVDF was taken in 25 ml of DMSO in a 100 ml round-bottomed (RB) flask at 27° C. To that 10.0 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.06 mm) was peeled out and analyzed by UV-vis absorption spectroscopy given in FIG. 7a. The UV shielding was observed up to 300 nm at 10% transference level and optical transparency was 79.5% at 700 nm.

Example: 37 UV Shielding Performance of PMMA/BFP-G Composite 500 mg of PMMA was taken in 25 ml of DMSO in a 100 ml round-bottomed (RB) flask at 27° C. To that 10.0 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 7a. The UV shielding was observed up to 240 nm at 0.5% transmittance level and optical transparency was 98.2% at 700 nm.

Example: 38 UV Shielding Performance of Agar/BFP-G Composite 3750 mg of agar was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIG. 7b. The UV shielding was observed up to 379 nm at 0.5% transmittance level and optical transparency was 92.6% at 700 nm.

Example: 39 UV Shielding Performance of Agarose/BFP-G Composite 3750 mg of agarose was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIG. 7b. The UV shielding was observed up to 419 nm at 0.5% transmittance level and optical transparency was 87.4% at 700 nm.

Example: 40 UV Shielding Performance of HMPC/BFP-G Composite 3750 mg of HMPC was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.07 mm) was peeled out and analyzed by UV-vis absorption spectroscopy given in FIG. 7b. The UV shielding was observed up to 312 nm at 0.5% transmittance level and optical transparency was 84.5% at 700 nm.

Example: 41 UV Shielding Performance of KCA/BFP-G Composite 3750 mg of KCA was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIG. 7b. The UV shielding was observed up to 266 nm at 0.5% transmittance level and optical transparency was 94.4% at 700 nm.

Example: 42 UV Shielding Performance of K-alg/BFP-G Composite 3750 mg of K-alg was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIG. 7b. The UV shielding was observed up to 339 nm at 0.5% transmittance level and optical transparency was 94.3% at 700 nm.

Example: 43 UV Shielding Performance of CMC/BFP-G Composite (0.5 wt % Loading of BFP-G in CMC)

3750 mg of CMC was taken in 25 ml of DMSO in a 100 ml round-bottomed (RB) flask at 27° C. To that 21.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIGS. 7b and 7c. The UV shielding was observed up to 300 nm at 0.5% transmittance level and optical transparency was 95.1% at 700 nm.

Example: 44 UV Shielding Performance of CMC/BFP-G Composite (1.0 wt % Loading of BFP-G in CMC)

3750 mg of CMC was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIG. 7c. The UV shielding was observed up to 425 nm at 0.5% transmittance level and optical transparency was 85.2% at 700 nm.

Example: 45 UV Shielding Performance of CMC/BFP-G Ccomposite (at Higher Amount of CMC While with 0.5 wt % Loading of BFP-G)

7500 mg of CMC was taken in 25 ml of DMSO in a 100 ml round-bottomed (RB) flask at 27° C. To that 42.0 mg of BFP-G (prepared as in Example:1a) was added. The flask was heated and stirred at 90° C. for 30 min. at 400 rpm and pH was adjusted to 8 (0.1M, NaHCO$_3$). The mixture was then transferred into a petri dish (1250×20 mm) and dried in an air oven at 65° C. for 3 days (for the removal of water) and cooled to room temperature. The thin film (0.08 mm) was peeled out and analyzed by UV-vis absorption spectroscopy given in FIG. 7c. The UV shielding was observed up to 425 nm at 0.5% transmittance level and optical transparency was 82.5% at 700 nm.

Example: 46 UV Shielding Performance of CMC/BFP-G Composite (Delaminated Mg$_2$Al-LDH was Used for pH Adjustment Iinstead of NaHCO$_3$)

3750 mg of CMC was taken in 25 ml of DMSO in a 100 ml round-bottomed (RB) flask at 27° C. To that 21.0 mg of BFP-G (prepared as in Example:1a) was added. The flask was heated and stirred at 90° C. for 30 min. at 400 rpm and 75 mg delaminated Mg$_2$Al-LDH as a solid base instead of NaHCO$_3$. The mixture was then transferred into a petri dish (1250×20 mm) and dried in an air oven at 65° C. for 3 days (for the removal of water) and cooled to room temperature. The thin film (0.07 mm) was peeled out and analyzed by UV-vis absorption spectroscopy given in FIG. 7c. The UV shielding was observed up to 239 nm at 0.5% transmittance level and optical transparency was 93.7% at 700 nm.

Example: 47 UV Shielding Performance of PVA/BFP-G Composite (Mixture Prepared in DMSO)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 8a. The UV shielding was observed up to 409 nm at 0.5% transmittance level and optical transparency was 81.8% at 700 nm.

Example: 48 UV Shielding Performance of PVA/BFP-G Composite (Mixture Prepared in DMF)

500 mg of PVA (Molecular weight=1,30,000, Sigma-Aldrich) was taken in 25 ml of DMF in a 100 ml round-bottomed (RB) flask at 27° C. To that 10.0 mg of BFP-G (prepared as in Example:1a) was added. The flask was heated and stirred at 90° C. for 30 min at 400 rpm. The mixture was then transferred into a petri dish (950×12 mm) and dried in an air oven at 90° C. for 3 days (for the removal of DMF) and cooled to room temperature. The thin film (0.07 mm) was peeled out and analyzed by UV-vis absorption spectroscopy given in FIG. 8a. The UV shielding was observed up to 356 nm at 0.5% transmittance level and optical transparency was 87.9% at 700 nm.

Example: 49 UV Shielding Performance of PVA/BFP-G Composite (Mixture Prepared in NMP)

500 mg of PVA (Molecular weight=1,30,000, Sigma-Aldrich) was taken in 25 ml of NMP in a 100 ml round-bottomed (RB) flask at 27° C. To that 10.0 mg of BFP-G (prepared as in Example:1a) was added. The flask was heated and stirred at 90° C. for 30 min at 400 rpm. The mixture was then transferred into a petri dish (950×12 mm) and dried in an air oven at 90° C. for 3 days (for the removal of NMP) and cooled to room temperature. The thin film (0.08 mm) was peeled out and analyzed by UV-vis absorption spectroscopy given in FIG. 8a. The UV shielding was observed up to 404 nm at 0.5% transmittance level and optical transparency was 86.1% at 700 nm.

Example: 50 UV Shielding Performance of PVA/BFP-G Composite (Mixture Prepared in DMSO at 60° C.)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) was added. The flask was heated and stirred at 60° C. for 30 min at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 8b. The UV shielding was observed up to 386 nm at 0.5% transmittance level and optical transparency was 84.5% at 700 nm.

Example: 51 UV Shielding Performance of PVA/BFP-G Composite (Mixture Prepared in DMSO at 120° C.)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) was added. The flask was heated and stirred at 120° C. for 30 min at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 8b. The UV shielding was observed up to 393 nm at 0.5% transmittance level and optical transparency was 83.2% at 700 nm.

Example: 52 UV Shielding Performance of PVA/BFP-G Composite (Composite Film made at 60° C.)

500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) was added. The flask was heated and stirred at 90° C. for 30 min at 400 rpm. The mixture was then transferred into a petri dish (950×12 mm) and dried in an air oven at 60° C. for 4 days (for the removal of DMSO) and cooled to room temperature. The thin film (0.08 mm) was peeled out and analyzed by UV-vis absorption spectroscopy given in FIG. 8c. The UV shielding was observed up to 356 nm at 0.5% transmittance level and optical transparency was 87.9% at 700 nm.

Example: 53 UV Shielding Performance of PVA/BFP-G Composite (Composite Film Made at 120° C.) 500 mg of PVA (Molecular weight=1,30,000, Sigma-Aldrich) was taken in 25 ml of DMSO in a 100 ml round-bottomed (RB) flask at 27° C. To that 10.0 mg of BFP-G (prepared as in Example:1a) was added. The flask was heated and stirred at 90° C. for 30 min at 400 rpm. The mixture was then transferred into a petri dish (950×12 mm) and dried in an air oven at 120° C. for 1.5 days (for the removal of DMSO) and cooled to room temperature. The thin film (0.07 mm) was peeled out and analyzed by UV-vis absorption spectroscopy given in FIG. 8c. The UV shielding was observed up to 389 nm at 0.5% transmittance level and optical transparency was 83.2% at 700 nm.

Example: 54 UV Shielding Performance of PVA/BFP-G Composite at 2.0 wt. % Loading of BFP-G on One Meter Scale 30 g of PVA (Molecular weight=1,30,000, Sigma-Aldrich) was taken in 1.5 L of DMSO in a 2.0 L round-bottomed (RB) flask at 27° C. To that 600 mg of BFP-G (prepared as in Example:1a) was added. The flask was heated and stirred at 90° C. for 1 h. at 400 rpm. The mixture was then transferred into a one meter glass plate (1000 cm×35 cm) and dried under incandescent light for 30 h (for the removal of DMSO) and cooled to room temperature. The thin film (0.08 mm) was peeled out and analyzed by UV-vis absorption spectroscopy given in FIG. 8d. The UV shielding was observed up to 406 nm at 0.5% transmittance level and optical transparency was 82.2% at 700 nm.

Example: 55 UV Shielding Performance of PVA/LCBFP Composite (BFP-G Decolorized with UV Treatment in THF Medium)

500 mg purified BFP-G (prepared as in Example:1a) was dissolved in 250 ml THF. The solution was irradiated with 200-400 nm ultraviolet radiation, which was provided by a 200 W tungsten UV lamp. After 5 hours of irradiation, the solution was added into 200 ml water, and THF was removed by rotary evaporation to obtain clear product mixture, which was freeze-dried for 24 hours. Light coloured bio-derived furanic polymer (LCBFP) which was obtained. 10 mg of LCBFP was taken in 25 ml of DMSO in a 100 ml round-bottomed (RB) flask at 27° C. To that 500 mg of PVA was added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.07 mm) was peeled out and analyzed by UV-vis absorption spectroscopy given in FIG. 13. The UV shielding was observed up to 343 nm at 0.5% transmittance level and optical transparency was 99.8% at 700 nm.

Example: 56 UV Shielding Performance of PVA/BFP-G Composite (BFP-G Decolorized with $H_2O_2$)

0.9 g of glucose, 0.1 mmol $CuCl_2.6H_2O$ and 0.3 g $Al_2O_3$ were added to 3 g DMSO which was preheated to 120° C., and then stirred at 800 rpm for 4 h. Then this mixture was cooled to room temperature (25° C.), 2 g 30%$H_2O_2$ was added and stirred for 6 h, centrifuged to remove catalyst, and added to 10 g water to precipitate BFP. BFP was separated by centrifugation, and washed 2 times each with 5 g of water, and 1 time with 5 g MeOH and then dried in vacuum at room temperature (25° C.) for 6 h. The amount of wet BFP obtained is 0.674 g. 500 mg of PVA (Molecular weight=1, 30,000, Sigma-Aldrich) was taken in 25 ml of DMSO in a 100 ml round-bottomed (RB) flask at 27° C. To that 10.0 mg of BFP-G Derived from glucose, $CuCl_2+Al_2O_3$ as catalyst, and $H_2O_2$ as a oxidant) were added. The flask was heated and stirred at 90° C. for 30 min. at 400 rpm. The mixture was then transferred into a petri dish (950×12 mm) and dried in an air oven at 90° C. for 3 days (for the removal of DMSO) and cooled to room temperature. The thin film (0.08 mm) was peeled out and analyzed by UV-vis absorption spectroscopy given in FIG. 13. The UV shielding was observed up to 358 nm at 0.5% transmittance level and optical transparency was 93.1% at 700 nm.

Example: 57 UV Shielding BFP (Prepared from 5wt % Glucose Substrate)

0.5 g of glucose and 0.3 mmol $AlCl_3.6H_2O$ catalyst were added to 10 g DMSO which was preheated to 120° C., and then stirred at 800 rpm for 8 h. Then this mixture was cooled to room temperature (25° C.) and added to 20 g water to precipitate BFP. BFP were separated by centrifugation, and washed 2 times each with 20 g of water, and 1 time with 20 g MeOH and then dried in vacuum at 25° C. for 6 h and in air oven for 12 h at 105° C. The amount of BFP obtained is 0.060 g.

Example: 58 UV Shielding BFP (Prepared from 70 wt % Glucose Substrate)

7 g of glucose and 0.3 mmol $AlCl_3.6H_2O$ catalyst were added to 10 g DMSO which was preheated to 120° C., and then stirred at 800 rpm for 8 h. Then this mixture was cooled to room temperature (25° C.) and added to 20 g water to precipitate BFP. BFP were separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 1.653 g.

Example: 59 UV Shielding BFP (Prepared in BMImCl Solvent)

1.5 g of glucose, and 0.3 mmol $CrCl_3.6H_2O$ were added to 5 g of 1-butyl-3-methylimidazolium chloride (BMImCl) which was preheated to 120° C., and then stirred at 800 rpm for 8 h. Then this mixture was cooled to room temperature (25° C.) and added to 20 g water to precipitate BFP. BFP were separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.789 g.

Example: 60 UV Shielding BFP (Prepared Using Ion-Exchange Resin Amberlyst-15 Catalyst)

5 g of fructose and 0.5 g Amberlyst-15 catalyst were added to 10 g DMSO which was preheated to 120° C., and then stirred at 800 rpm for 8 h. Then this mixture was cooled to room temperature (25° C.), centrifuged to remove catalyst, and added to 20 g water to precipitate BFP. BFP were separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.156 g.

Example: 61 UV Shielding BFP (Prepared Using Ion-Exchange Resin INDION-190 Catalyst)

5 g of fructose and 0.5 g INDION-190 catalyst were added to 10 g DMSO which was preheated to 120° C., and then stirred at 800 rpm for 8 h. Then this mixture was cooled to room temperature (25° C.), centrifuged to remove catalyst, and added to 20 g water to precipitate BFP. BFP were separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.782 g.

Example: 62 UV Shielding BFP (BFP is Precipitated Using 75 g Water)

5 g of glucose and 0.3 mmol $AlCl_3.6H_2O$ catalyst were added to 10 g DMSO which was preheated to 120° C., and then stirred at 800 rpm for 8 h. Then this mixture was cooled to room temperature (25° C.) and added to 75 g water to precipitate BFP. BFP were separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.831 g.

Example: 63 UV Shielding BFP (BFP is Precipitated Using 20 g MeOH)

5 g of glucose and 0.3 mmol $AlCl_3.6H_2O$ catalyst were added to 10 g DMSO which was preheated to 120° C., and then stirred at 800 rpm for 8 h. Then this mixture was cooled to room temperature (25° C.) and added to 20 g MeOH to precipitate BFP. BFP were separated by centrifugation, and washed 2 times each with 20 g of water, and 1 time with 20 g MeOH and then dried in vacuum at room temperature (25° C.) for 6 h and in air oven for 12 h at 105° C. The amount of BFP obtained is 0.72 g.

Example: 64 UV Shielding BFP (BFP Obtained in Wet Form Without Drying)

125 g of glucose and 1 g $AlCl_3.6H_2O$ catalyst were added to 250 g DMSO which was preheated to 140° C., and then stirred at 250 rpm with mechanical stirring for 4 h. Then this mixture was cooled to room temperature and added to 1000 g water to precipitate BFP. BFP were separated by filtration through Buckner funnel and washed by adding large amount of water (1 L), then dried in vacuum at 25° C. for 3 days. The amount of wet BFP obtained is 106 g. This BFP is coded as BFP-W.

Example: 65 UV Shielding BFP (BFP Dried in Vacuum Followed by Oven at 90° C.)

125 g of glucose and 1 g $AlCl_3.6H_2O$ catalyst were added to 250 g DMSO which was preheated to 140° C., and then stirred at 250 rpm with mechanical stirring for 4 h. Then this mixture was cooled to room temperature and added to 1000 g water to precipitate BFP. BFP were separated by filtration through Buckner funnel and washed by adding large amount of water (1 L), then dried in vacuum for 12 h and in air oven at 90° C. for one day. The amount of dried BFP formed is 14 g. This BFP is coded as BFP-O.

Example: 66 UV Shielding BFP (BFP Washed with MeOH and Dried in Open Atmosphere at 25° C.)

125 g of glucose and 1 g $AlCl_3.6H_2O$ catalyst were added to 250 g DMSO which was preheated to 140° C., and then stirred at 250 rpm with mechanical stirring for 4 h. Then this mixture was cooled to room temperature and added to 1000 g water to precipitate BFP. BFP were separated by filtration through Buckner funnel and washed by adding large amount of water (1 L), and then the polymer was washed two times with 200 g MeOH, centrifuged and dried in open atmosphere at 25° C. for 5 h. The solid was completely dried and weight of BFP obtained is 14 g. This BFP is coded as BFP-M.

Example: 67 UV Shielding BFP (BFP Separated by Centrifugation)

125 g of glucose and 1 g $AlCl_3.6H_2O$ catalyst were added to 250 g DMSO which was preheated to 140° C., and then stirred at 250 rpm with mechanical stirring for 4 h. Then this mixture was cooled to room temperature and added to 1000 g water to precipitate BFP. BFP were separated by centrifugation, washed 3 times with each of 250 ml water followed by centrifugation, then dried in vacuum for 12 h and in air oven at 90° C. for one day. The amount of dried BFP formed is 14 g.

Example: 68 UV Shielding BFP (BFP Washed with Water and Dried in Vacuum at 70° C.)

25 g of glucose and 1.5 mmol $AlCl_3.6H_2O$ catalyst were added to 50 g DMSO which was preheated to 140° C., and then stirred at 800 rpm for 3 h. Then this mixture was cooled to room temperature (25° C.) and 10 g of this mixture was added to 40 g water to precipitate BFP. BFP were separated by centrifugation, and washed 3 times each with 30 g of water and then dried in vacuum at 70° C. for 1 day. The amount of BFP obtained is 0.86 g.

Example: 69 UV Shielding BFP (BFP Washed with Water and Dried in Air Oven at 80° C.)

25 g of glucose and 1.5 mmol $AlCl_3.6H_2O$ catalyst were added to 50 g DMSO which was preheated to 140° C., and then stirred at 800 rpm for 3 h. Then this mixture was cooled to room temperature (25° C.) and 10 g of this mixture was added to 40 g water to precipitate BFP. BFP were separated by centrifugation, and washed 3 times each with 30 g of water and then dried in air oven at 80° C. for 12 h. The amount of BFP obtained is 0.905 g.

ADVANTAGES OF THE INVENTION

Efficient performance of bio-derived furanic polymer (BFP) in shielding of complete UV region even at a very low concentration level of BFP.
Similar performance of decolorized BFP for UV shielding invoking better commercial applicability.
Ease of making BFP from wide variety of biomass saccharides in high concentrations by using various types of solvents and catalytic systems.
Reproducible physicochemical properties of BFP irrespective of the source, catalyst, and medium.
High compatibility of BFP with many commercial and bio-polymers to make UV-shielding composite thin films by an easy and simple solvent casting process.
Ability to tune UV-shielding region (UVA, UVB, UVC and visible region) by modifying the film with process variables such as BFP concentration.
UV-shielding efficiency of the PVA/BFP thin composite film can be tuned by varying the treatment temperature (−20 to 210° C.).
Excellent thermal and mechanical stability with elasticity of PVA/BFP composites thin film.
PVA/BFP thin composite film are durable even at extended UV-irradiation (90 min), sunlight (30 days)
Green method of processing BFP, as water is used for precipitation and washing of BFP.
Ease of further processing the supernatant HMF solution (probably having metal salts, mineral acids) obtained after BFP removal.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. Any embodiment that can be made and that changes can be made in the preferred embodiments without departing from the principles of the disclosure is to be considered within the scope of this disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A UV shielding composite thin film having a thickness in a range of 0.06 to 0.08 mm, the UV shielding composite thin film consisting of by wt % in the UV shielding composite thin film: i) 0.5 to 2.0 wt % of a furanic polymer; and ii) 99.5 to 98.0 wt % of a synthetic polymer or a polymer selected from the group consisting of agar, agarose, carboxymethylcellulose, hydroxypropylmethylcellulose, κ-carrageenan and potassium alginate.

2. The UV shielding composite thin film as claimed in claim 1, wherein the furanic polymer is a biomass saccharide derived furanic polymer (BFP) obtained by a process comprising the steps of:
   a) catalytically dehydrating a biomass saccharide in dimethyl sulfoxide (DMSO) or 1-butyl,3-methylimidazolium chloride to obtain BFP;
   b) separating the BFP from a reaction mixture obtained in step a) by precipitation using a precipitation solvent selected from the group consisting of water and MeOH;
   c) washing the precipitated BFP with water, MeOH, or both; and
   d) drying BFP using a set of conditions selected from the group consisting of:
   ambient condition at temperature in a range of 24-28° C., in vacuum at 25° C. to 70° C., and at a temperature in a range of 80 to 105° C.

3. The UV shielding composite thin film as claimed in claim 2, wherein the biomass saccharide is selected from the group consisting of agarose chitosan, carrageenan, cellulose, seaweed cellulose (Ulva), potassium alginate, starch, glucose, fructose, sucrose and xylose and the catalyst is selected from the group consisting of $AlCl_3$, $CrCl_3$, $CuCl_2$ +alumina, ion-exchange resins and HCl.

4. The UV shielding composite thin film as claimed in claim 1, wherein the synthetic polymer is selected from the group consisting of polyvinyl alcohol, polyvinyl chloride, polyvinylidene fluoride and polymethyl methacrylate.

5. The UV shielding composite thin film as claimed in claim 1, wherein the UV shielding composite thin film has a UV-shielding efficiency, determined using UV-vis absorption spectroscopy, of 375 nm, on exposure to UV-radiation for 90 min, or in sunlight for 30 days, and wherein the UV-shielding efficiency of the UV shielding composite thin film is in a range of 375-490 nm upon a thermal treatment in a range of −20 to 210° C.

6. A process for preparing the UV shielding composite thin film of claim 1, the process consisting of:
   i. catalytically dehydrating a biomass saccharide in DMSO, or 1-butyl,3-methylimidazolium chloride to obtain a biomass saccharide derived furanic polymer (BFP) in a reaction mixture;
   ii. separating the BFP from the reaction mixture by precipitation using a precipitation solvent selected from the group consisting of water and MeOH;
   iii. washing the precipitated BFP with water, MeOH or both;
   iv. drying BFP using ambient condition at temperature in the range of 24-28° C., or vacuum at 25° C. to 70° C., or temperature in the range of 80 to 105°C.;
   v. dissolving a synthetic or polymer selected from the group consisting of agar, agarose, carboxymethylcellulose, hydroxypropylmethylcellulose, κ-carrageenan and potassium alginate and the BFP prepared in step i) in a solvent at a temperature in a range of 60 to 120° C. under stirring in a range of 350-450 rpm to form a homogenous solution;
   vi. drying the homogenous solution obtained in step (v) at a temperature in a range of 60 to 120° C. for 2 to 4 days to obtain the composite thin film;
   vii. cooling the composite thin film to a temperature in a range of 24-28° C., and
   viii. peeling out the composite thin film.

7. The process as claimed in claim 6, wherein the solvent used in step (v) is selected from the group consisting of dimethyl sulfoxide, n-methyl-2-pyrrolidone, dimethyl formamide and tetrahydrofuran.

8. The process as claimed in claim 6, wherein a color of the composite thin film is modified by treating with hydrogen peroxide, or by UV irradiation in THF (tetrahydrofuran).

* * * * *